United States Patent
Yoshimura

(10) Patent No.: US 8,327,043 B2
(45) Date of Patent: Dec. 4, 2012

(54) BUFFER MANAGEMENT DEVICE WHICH MANAGES BUFFER TRANSFER, STORAGE APPARATUS COMPRISING THE SAME DEVICE, AND BUFFER MANAGEMENT METHOD

(75) Inventor: Noritsugu Yoshimura, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/100,047

(22) Filed: May 3, 2011

(65) Prior Publication Data

US 2012/0030385 A1 Feb. 2, 2012

(30) Foreign Application Priority Data

Jul. 29, 2010 (JP) ................................. 2010-171137

(51) Int. Cl.
*G06F 3/00* (2006.01)
*G06F 5/00* (2006.01)
(52) U.S. Cl. .......................................... 710/52; 710/30
(58) Field of Classification Search .................. None
See application file for complete search history.

(56) References Cited

U.S. PATENT DOCUMENTS

| | | | | |
|---|---|---|---|---|
| 6,631,484 | B1 * | 10/2003 | Born | 710/305 |
| 6,877,048 | B2 * | 4/2005 | Bilak et al. | 710/52 |
| 7,826,466 | B2 * | 11/2010 | Patella et al. | 370/412 |
| 2006/0092934 | A1 * | 5/2006 | Chung et al. | 370/389 |
| 2006/0184708 | A1 * | 8/2006 | Sleeman et al. | 710/313 |
| 2010/0272162 | A1 * | 10/2010 | Simeon et al. | 375/220 |
| 2011/0131375 | A1 * | 6/2011 | Noeldner et al. | 711/114 |

FOREIGN PATENT DOCUMENTS

| | | |
|---|---|---|
| JP | 2001-517888 | 10/2001 |
| JP | 2001-523862 | 11/2001 |
| JP | 2002-023966 | 1/2002 |
| JP | 2002-520691 | 7/2002 |
| JP | 2002-543514 | 12/2002 |
| JP | 2004-171362 | 6/2004 |
| JP | 2006-195990 | 7/2006 |
| JP | 2008-197864 | 8/2008 |

OTHER PUBLICATIONS

Japanese Office Action dated Aug. 3, 2011, filed in Japanese counterpart Application No. 2010-171137, 7 pages (with English translation).

* cited by examiner

*Primary Examiner* — Kris Rhu
(74) *Attorney, Agent, or Firm* — Patterson & Sheridan, LLP

(57) ABSTRACT

According to one embodiment, a table holds buffer transfer information for managing data transfer, specified by each data transfer command, between a transmission FIFO and a buffer or between a reception FIFO and the buffer via a intermediate FIFO. A first sequencer activates buffer transfer for data transfer specified by a data transfer command from the host in units of at least one frame on the basis of corresponding buffer transfer information held in the table. The buffer transfer includes data transfer in sectors between the buffer and the intermediate FIFO. A second sequencer transfers data in frames between the transmission FIFO and the intermediate FIFO or between the reception FIFO and the intermediate FIFO in accordance with the activation of the buffer transfer. A third sequencer transfers data in sectors between the intermediate FIFO and the buffer in accordance with the activation of the buffer transfer.

9 Claims, 22 Drawing Sheets

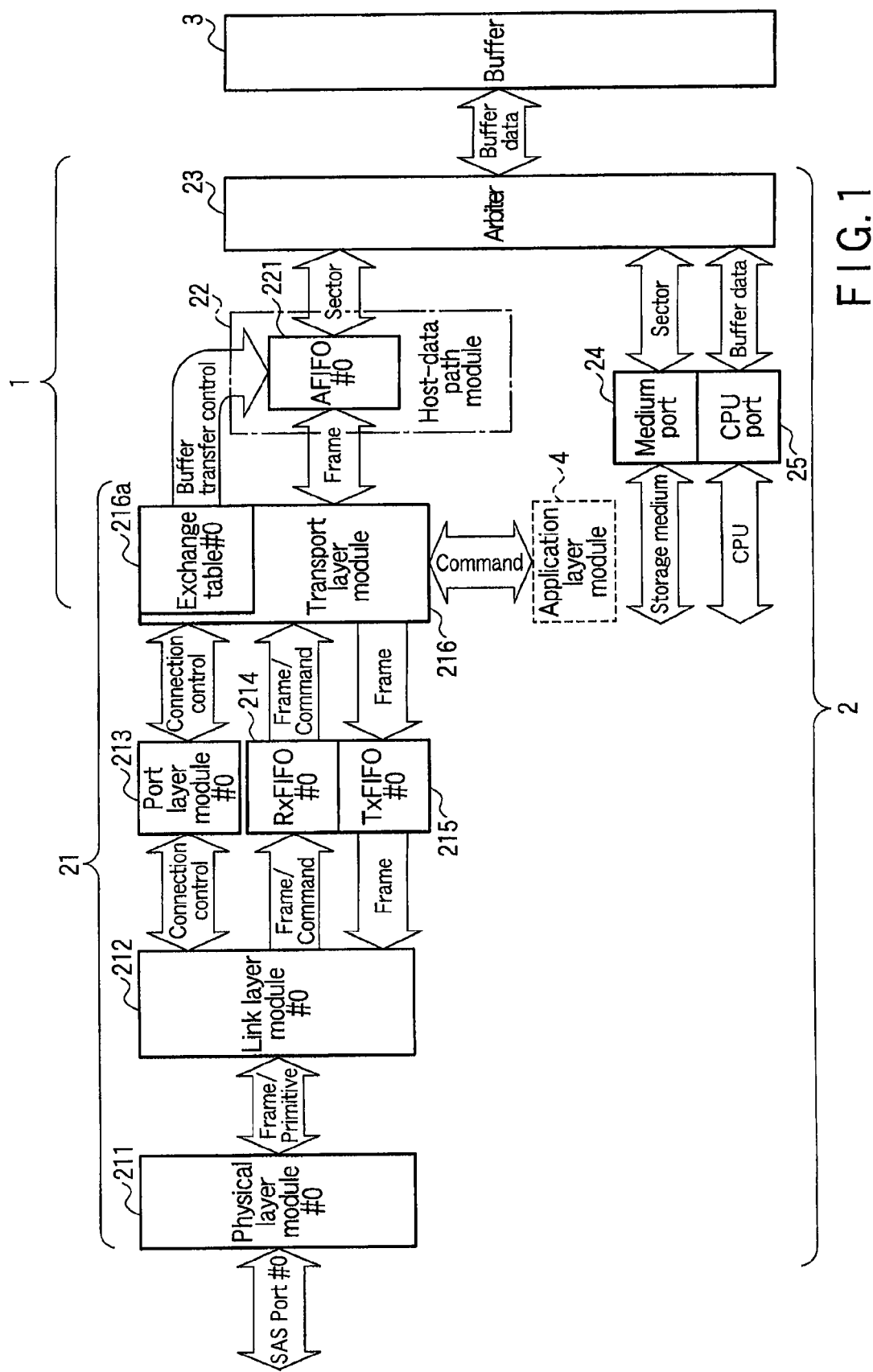
F I G. 1

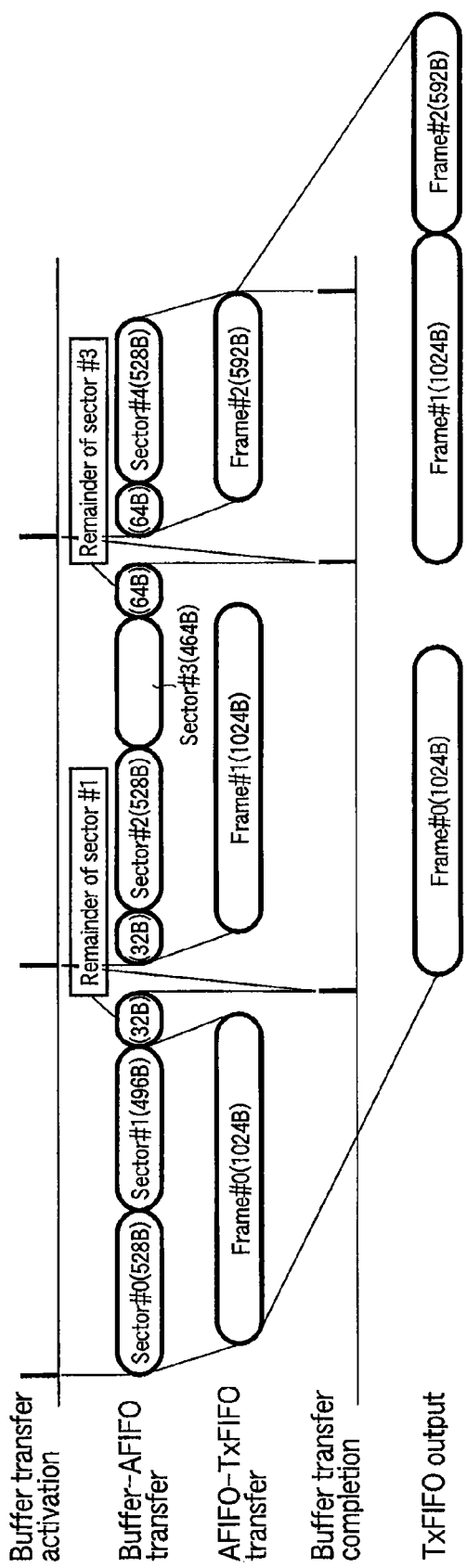
F I G. 6

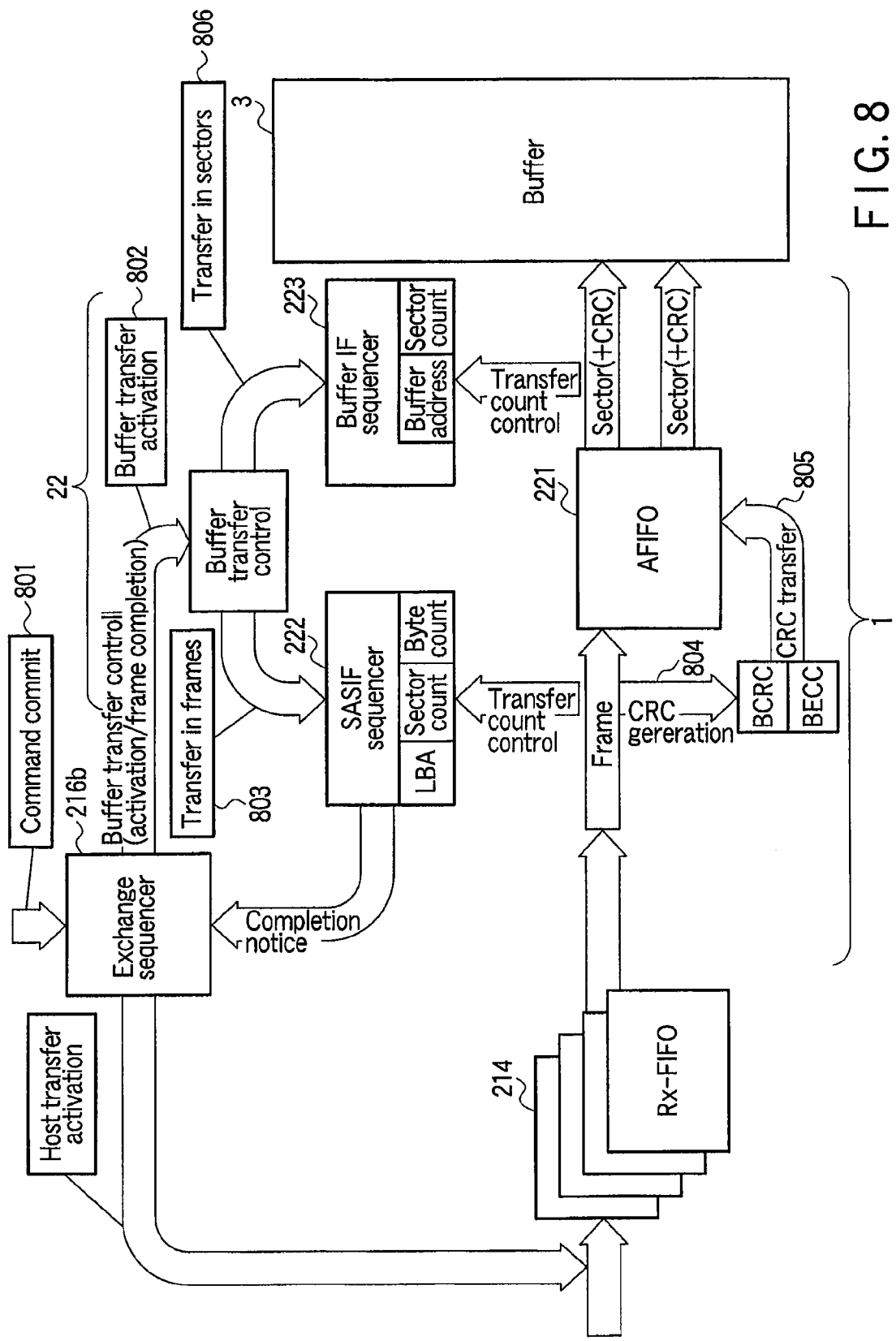
F I G. 8

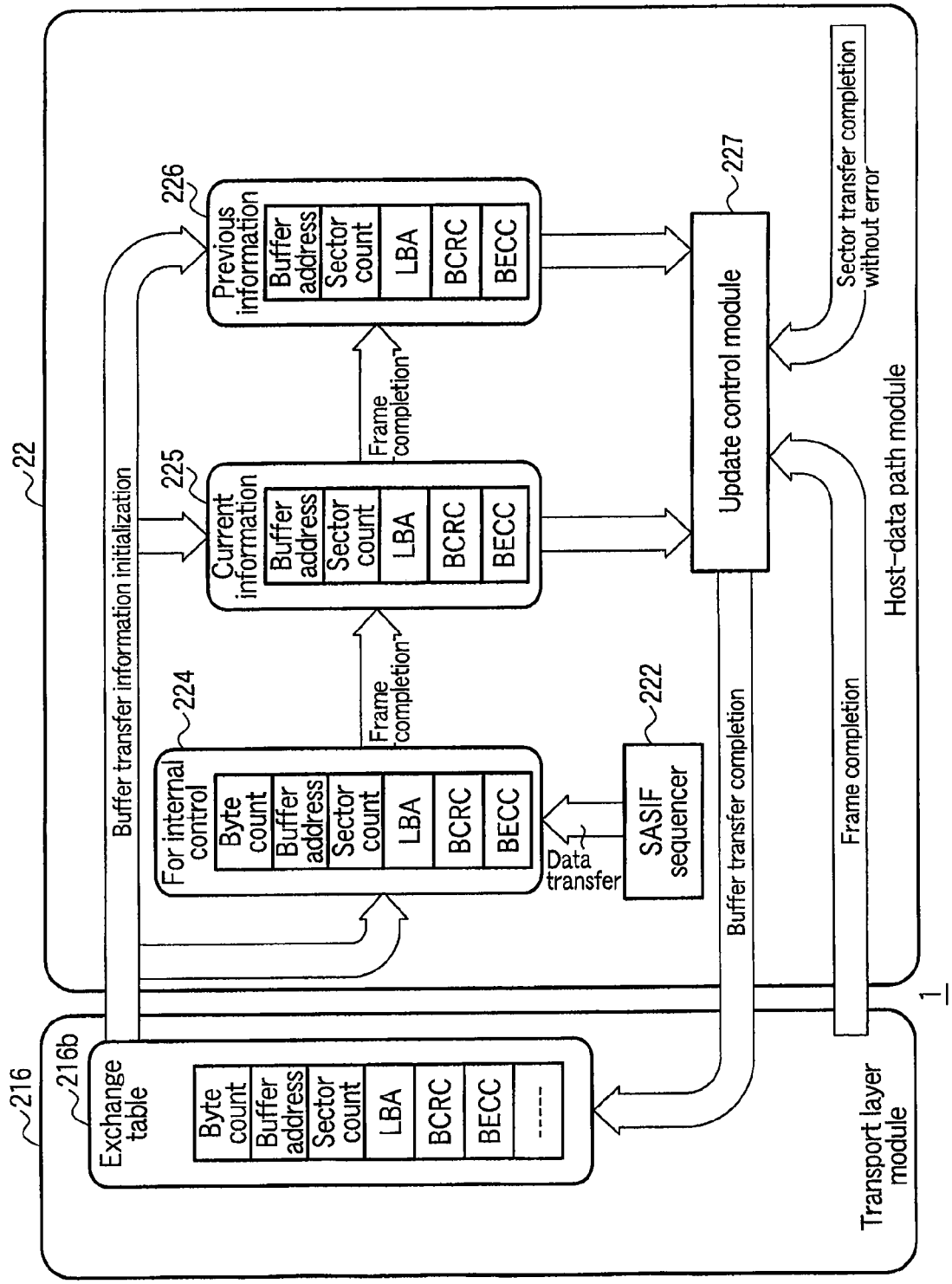
F I G. 13

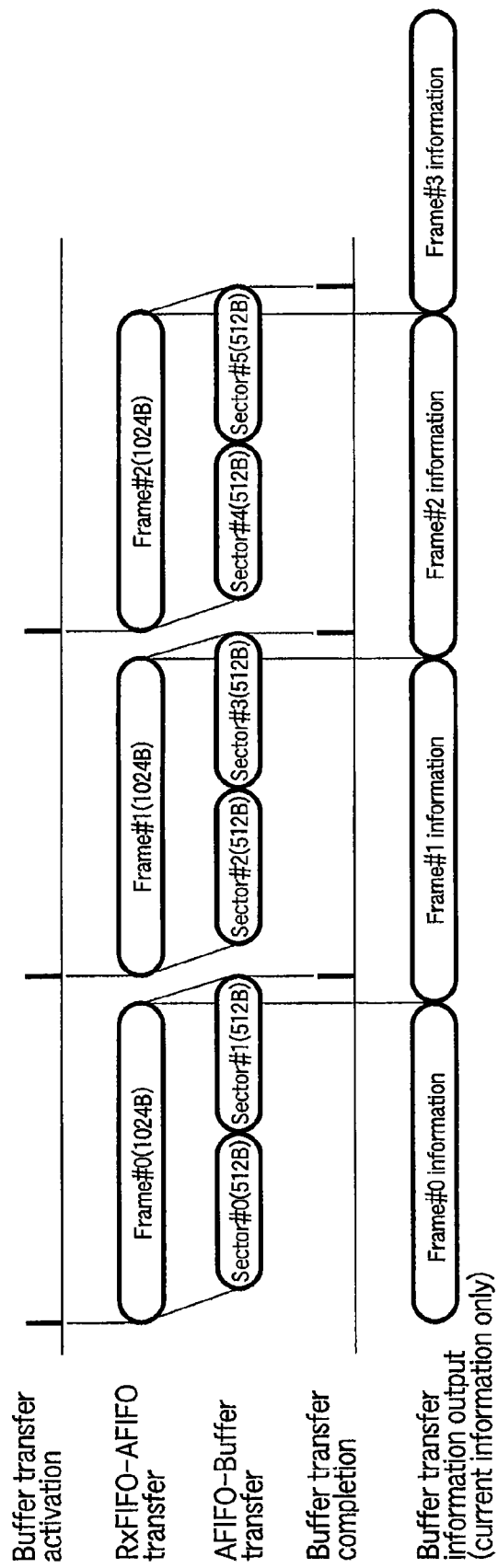
F I G. 18

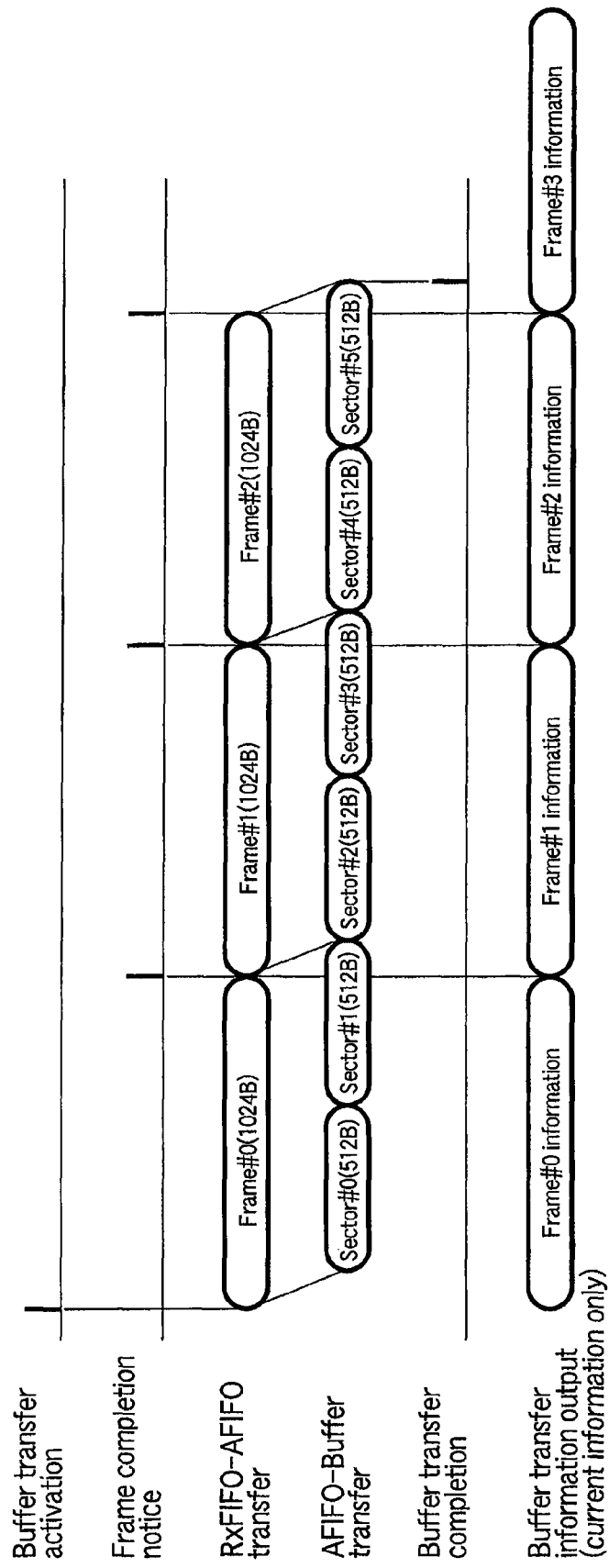
F I G. 19

US 8,327,043 B2

BUFFER MANAGEMENT DEVICE WHICH MANAGES BUFFER TRANSFER, STORAGE APPARATUS COMPRISING THE SAME DEVICE, AND BUFFER MANAGEMENT METHOD

CROSS-REFERENCE TO RELATED APPLICATIONS

This application is based upon and claims the benefit of priority from Japanese Patent Application No. 2010-171137, filed Jul. 29, 2010; the entire contents of which are incorporated herein by reference.

FIELD

Embodiments described herein relate generally to a buffer management device which manages buffer transfer, a storage apparatus comprising the buffer management device, and a buffer management method.

BACKGROUND

A storage apparatus, such as a magnetic disk drive or a solid-state drive (SSD), generally comprises a host interface. One known magnetic disk drive is a hard disk drive (HDD). The host interface controls data transfer between a host and a storage device. Between the host interface and storage device, there is provided a buffer which temporarily stores data transferred between the host and storage device. Data transfer between the host interface and buffer is known as buffer transfer. Data transfer between the host and host interface is known as frame transfer because data is transferred using frames.

Suppose, in the conventional art, data specified by a data transfer command, such as a read command, given by the host to the storage apparatus is read from the storage device of the storage apparatus and transferred via the buffer. That is, suppose buffer transfer corresponding to the data transfer command from the host is activated. The conventional art is not based on the assumption that, when buffer transfer corresponding to a certain data transfer command has been activated, buffer transfer corresponding to another data transfer command is inserted by the time when the execution of the data transfer command has been completed.

Therefore, in the conventional art, when the execution of the data transfer command is being delayed, buffer transfer corresponding to another data transfer command is forced to wait. This results in a decrease in the efficiency of buffer transfer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of a host interface with a buffer manager according to an embodiment;

FIG. 6 is a timing chart to explain a third example of read data transfer in the embodiment;

FIG. 8 is a diagram to explain exemplary write data transfer in the embodiment;

FIG. 13 is a block diagram showing an exemplary configuration of the buffer manager in the embodiment, centering on a buffer transfer information management function;

FIG. 18 is a timing chart to explain a first example of write data transfer in the embodiment in association with the transfer of buffer transfer information;

FIG. 19 is a timing chart to explain a second example of write data transfer in the embodiment in association with the transfer of buffer transfer information;

DETAILED DESCRIPTION

Figure 2:
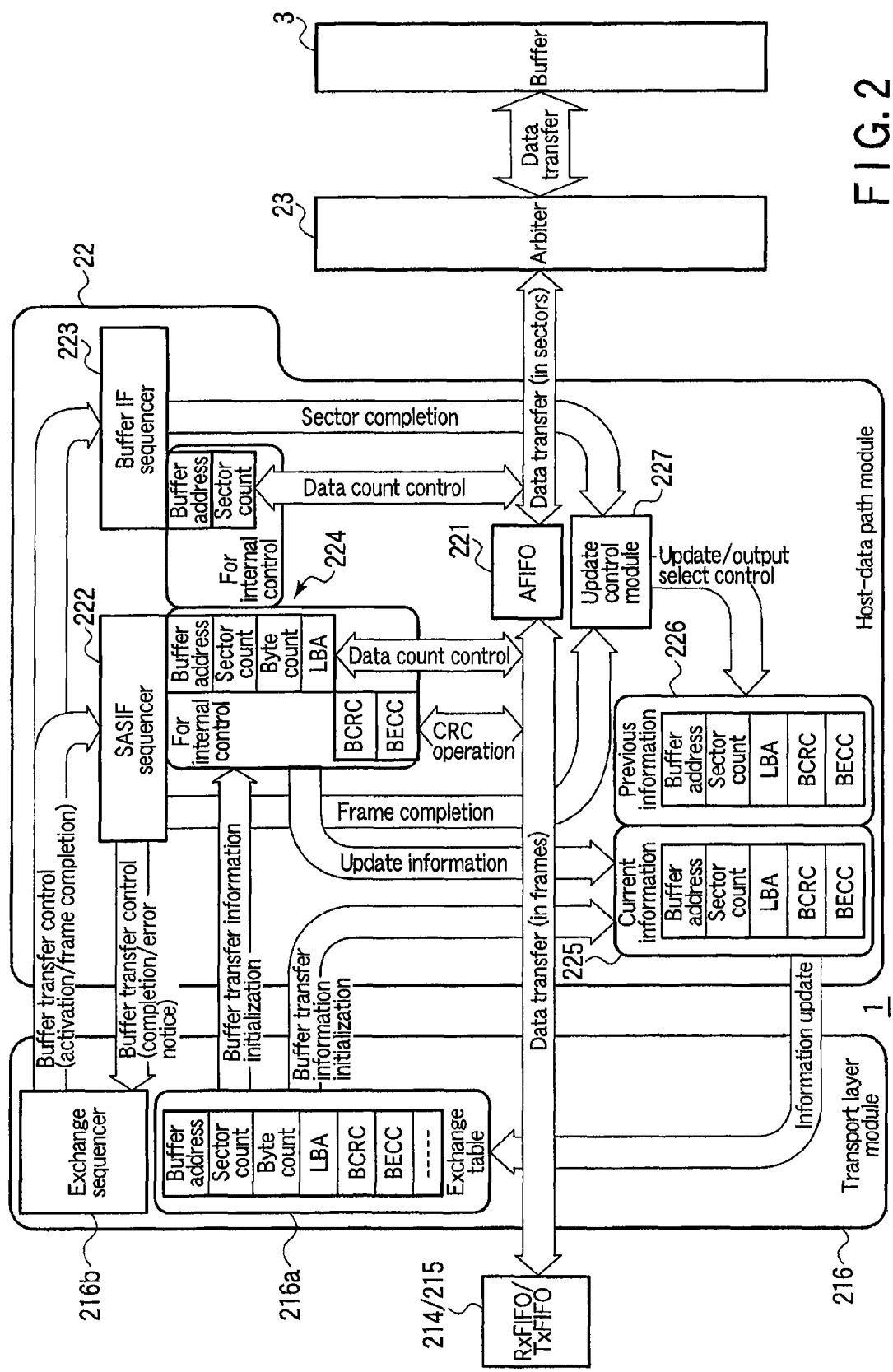
FIG. 2 is a block diagram showing an exemplary configuration of the buffer manager in the embodiment.

Various embodiments will be described hereinafter with reference to the accompanying drawings. In general, according to one embodiment, there is provided a buffer management device configured to manage data transfer between a transmission FIFO and a buffer and between a reception FIFO and the buffer. The transmission FIFO is configured to store data to be transferred in frames to a host. The reception FIFO is configured to store data transferred in frames from the host. The buffer management device comprises an intermediate FIFO, a table, a first sequencer, a second sequencer and a third sequencer. The intermediate FIFO is configured to stored data transferred between the transmission FIFO and the buffer or between the reception FIFO and the buffer. The table is configured to hold buffer transfer information for managing data transfer between the transmission FIFO and the buffer or between the reception FIFO and the buffer via the intermediate FIFO. The data transfer is specified by each data transfer command from the host. The first sequencer is configured to activate buffer transfer for data transfer specified by a data transfer command from the host in units of at least one frame on the basis of corresponding buffer transfer information held in the table. The buffer transfer includes data transfer in sectors between the buffer and the intermediate FIFO. The second sequencer is configured to transfer data in frames between the transmission FIFO and the intermediate FIFO or between the reception FIFO and the intermediate FIFO in accordance with the activation of the buffer transfer. The third sequencer configured to transfer data in sectors between the intermediate FIFO and the buffer in accordance with the activation of the buffer transfer.

FIG. 1 is a block diagram showing an exemplary configuration of a host interface comprising a buffer management apparatus (hereinafter, referred to as a buffer manager) according to an embodiment. In the embodiment, a buffer manager 1 shown in FIG. 1 is included in a host interface 2 of a storage apparatus, such as a magnetic disk drive or a solid-state drive. The storage apparatus comprises not only the host interface 2 but also a buffer 3.

The buffer 3 temporarily stores a command and data transferred between a host (not shown) and a storage device. The buffer 3 is composed of a rewritable memory, such as a Double Data Rate (DDR) Synchronous Dynamic Random Access Memory (SDRAM). The host performs serial data transfer with (or transmits and receives serial data to and from) the storage apparatus via a Serial Attached SCSI (SAS). The serial data transfer uses, for example, frames. The storage device includes a magnetic recording medium as a storage (recording) medium if the storage apparatus is a magnetic disk drive or a rewritable nonvolatile memory as a storage medium if the storage apparatus is a solid-state drive. The host may perform serial data transfer with the storage apparatus via a serial ATA (SATA) or a fibre channel (FC) interface.

The host interface 2 comprises an SAS module 21, a host-data path module 22, and an arbiter 23. The SAS module 21 comprises a physical layer module 211, a link layer module 212, a port layer module 213, a reception FIFO (hereinafter, referred to as RxFIFO) 214, a transmission FIFO (hereinafter, referred to as TxFIFO) 215, and a transport layer module 216.

The physical layer module 211 performs serial data transfer with (or transmits and receives serial data to and from) the host in frames via a specific SAS port. In the embodiment, suppose the port number (#) of the specific SAS port is 0 (#0). Hereinafter, the specific SAS port is called SAS port #0. The physical layer module 211 converts serial reception data (reception frames) into parallel reception data (reception frames) and parallel transmission data (transmission frames) into serial transmission data (transmission frames).

The link layer module 212 transfers parallel reception frames transferred from the physical layer module 211 to the transport layer module 216 via RxFIFO 214. The link layer module 212 also transfers parallel transmission frames transferred from the transport layer module 216 via TxFIFO 215 to the physical layer module 211.

The port layer module 213 controls the connection between the link layer module 212 and transport layer module 216.

RxFIFO 214 is a first-in first-out (FIFO) buffer for temporarily storing reception frames transferred from the link layer module 212 and outputting the frames to the transport layer module 216 in the order in which RxFIFO 214 has stored the frames. TxFIFO 215 is a first-in first-out buffer for temporarily storing transmission frames transferred from the transport layer module 216 and outputting the frames to the link layer module 212 in the order in which TxFIFO 215 has stored the frames.

The transport layer module 216 transfers reception frames to the host-data path module 22. The transport layer module 216 also transfers transmission frames transferred from the host-data path module 22 to the link layer module 212 via TxFIFO 215. The transport layer module 216 interprets reception frames. When the reception frames include such a command as a read command or a write command, the transport layer module 216 transfers the command to the application layer module 4. The transport layer module 216 includes an exchange table 216a described later.

The host-data path module 22 includes an intermediate FIFO (hereinafter, referred to as an AFIFO) 221. AFIFO 221 is between the RxFIFO 214 and TxFIFO 215 and the buffer 3. AFIFO 221 is a first-in first-out buffer which stores reception frames in sequence and outputs the frames in sectors in the order in which AFIFO 221 has stored the frames. As is well known, a sector is the smallest unit in which a storage medium is accessed. AFIFO 221 is also a first-in first-out buffer which stores transmission sectors in sequence and outputs the sectors in frames in the order in which AFIFO 221 has stored the sectors. That is, AFIFO 221 is an intermediate buffer used for the conversion of frame data into sector data and the conversion of sector data into frame data.

The arbiter 23 arbitrates data transfer between the host-data path module 22 (more specifically, AFIFO 221 in the host-data path module 22), a media port 24 or a CPU port 25 and the buffer 3. This transfer is called buffer transfer. The media port 24 is a port corresponding to a storage medium. The CPU port 25 is a port corresponding to a CPU. The CPU functions as a main controller of the storage apparatus. In the embodiment, the buffer manager 1 comprises the transport layer module 216 (transport layer module 216 in the SAS module 21), host-data module 22, and arbiter 23.

FIG. 2 is a block diagram showing a detailed configuration of the buffer manager 1. The transport layer module 216 of the buffer manager 1 includes an exchange sequencer 216b in addition to the exchange table 216a shown in FIG. 1. The exchange table 216a holds management information (hereinafter, buffer transfer information) for managing data transfer (buffer transfer) between the RxFIFO 214 and TxFIFO 215 and the buffer 3 on the basis of a command from the host. The buffer transfer information held in the exchange table 216a is associated with the command on a command basis. In the explanation below, a command involving data transfer, such as a read command or a write command, is called a data transfer command.

Buffer transfer information held in the exchange table 216a includes a buffer address, a sector count, a byte count, a logical block address (hereinafter, referred to as LBA), a cyclic redundancy check data (hereinafter, referred to as BCRC), and an error correction code (hereinafter, referred to as BECC). The buffer address, which represents the address of the buffer 3 in buffer transfer (more specifically, buffer transfer specified by the corresponding transfer command), is updated as the buffer transfer progresses. The sector count, which represents the sector location of a first sector to be transferred in buffer transfer, is updated as the buffer transfer progresses. The sector count represents a relative sector location in sector transfer to be started next and is used as a sector pointer.

The byte count, which represents the total number of bytes to be transferred in buffer transfer, is updated as the buffer transfer progresses. The LBA, which represents the logical address (logical block address) of data to be transferred in buffer transfer, is updated as the buffer transfer progresses. The byte count and the initial value of the LBA are specified by the corresponding data transfer command. The initial value of the sector count is calculated on the basis of the byte count specified by the corresponding data transfer command and the number of bytes per sector. The BCRC represents CRC data (CRC value) attached to sector data transferred in buffer transfer. The BECC represents an error-correction code (ECC) included in the sector data. As described above, buffer transfer information held (stored) in the exchange table 216a for each data transfer command includes a buffer address, a sector count, BCRC, and BECC in addition to the byte count whose initial value is specified by the corresponding data transfer command and LBA.

The exchange sequencer 216b activates buffer transfer in, for example, frames to divide the corresponding transfer data into frames on a data transfer command basis and perform buffer transfer in the order of frames (that is, sequential frame transfer). The exchange sequencer 216b inserts (or activates) buffer transfer corresponding to another data transfer command different from the data transfer command now in execution without being influenced by the direction of buffer transfer (that is, whether the buffer 3 is read from or written into).

The host-data path module 22 comprises not only AFIFO 221 but also an SAS interface sequencer (hereinafter, referred to as an SASIF sequencer) 222, a buffer interface sequencer (hereinafter, referred to as a buffer IF sequencer) 223, register files 224, 225, and 226, and an update control module 227. The SASIF sequencer 222 transfers read data specified by a read command from the host from AFIFO 221 to TxFIFO 215 in frames on the basis of internal control buffer transfer information described later. The SASIF sequencer 222 also transfers write data specified by a write command from the host from RxFIFO 214 to AFIFO 221 in frames on the basis of internal control buffer transfer information.

The buffer IF sequencer 223 transfers read data specified by a read command from the host from the buffer 3 to AFIFO 221 in sectors on the basis of internal control buffer transfer information. The buffer IF sequencer 223 also transfers write data specified by a write command from the host from AFIFO 221 to the buffer 3 in sectors on the basis of internal control buffer transfer information.

The internal control buffer transfer information is updated dynamically as data transfer in frames (frame transfer) and data transfer in sectors (sector transfer) progress. The host-data path module 22 holds and manages not only the internal control buffer transfer information but also the current buffer transfer information described later and the previous buffer transfer information. In the explanation below, the current buffer transfer information and the previous buffer transfer information are referred to as the current information and the previous information, respectively.

The internal control buffer transfer information, current information, and previous information are held in register files 224, 225, and 226 (described later), respectively. That is, when buffer transfer corresponding to a data transfer command is activated, buffer transfer information stored in the exchange table 216a in association with the data transfer command is set initially in the register files 224, 225, and 226. When the exchange sequencer 216b has informed the host-data path module 22 of frame completion described later, the current information is updated to the internal buffer transfer information and the previous information is updated to the current information. As a result, the internal control buffer transfer information and current information at the time that frame completion was notified are used as new current information and new previous information, respectively.

When the activated buffer transfer has been completed, the update control module 227 feeds back the current information at the time as the initial value of buffer transfer information for next buffer transfer to the exchange table 216a. If the SASIF sequencer 222 has detected an error in a CRC check described later, the update control module 227 feeds back the previous information in place of the current information. This enables the exchange table 216a to be updated (returned) to the state at the time that the buffer transfer of the current frame was started and retry buffer transfer without the need for the CPU to perform a firmware (FW) process (FW process). The host-data path module 22 further comprises register files 224, 225, 226 and an update control module 227. The register files 224, 225, 226 and update control module 227 will be described later with reference to FIG. 13.

Figure 3:
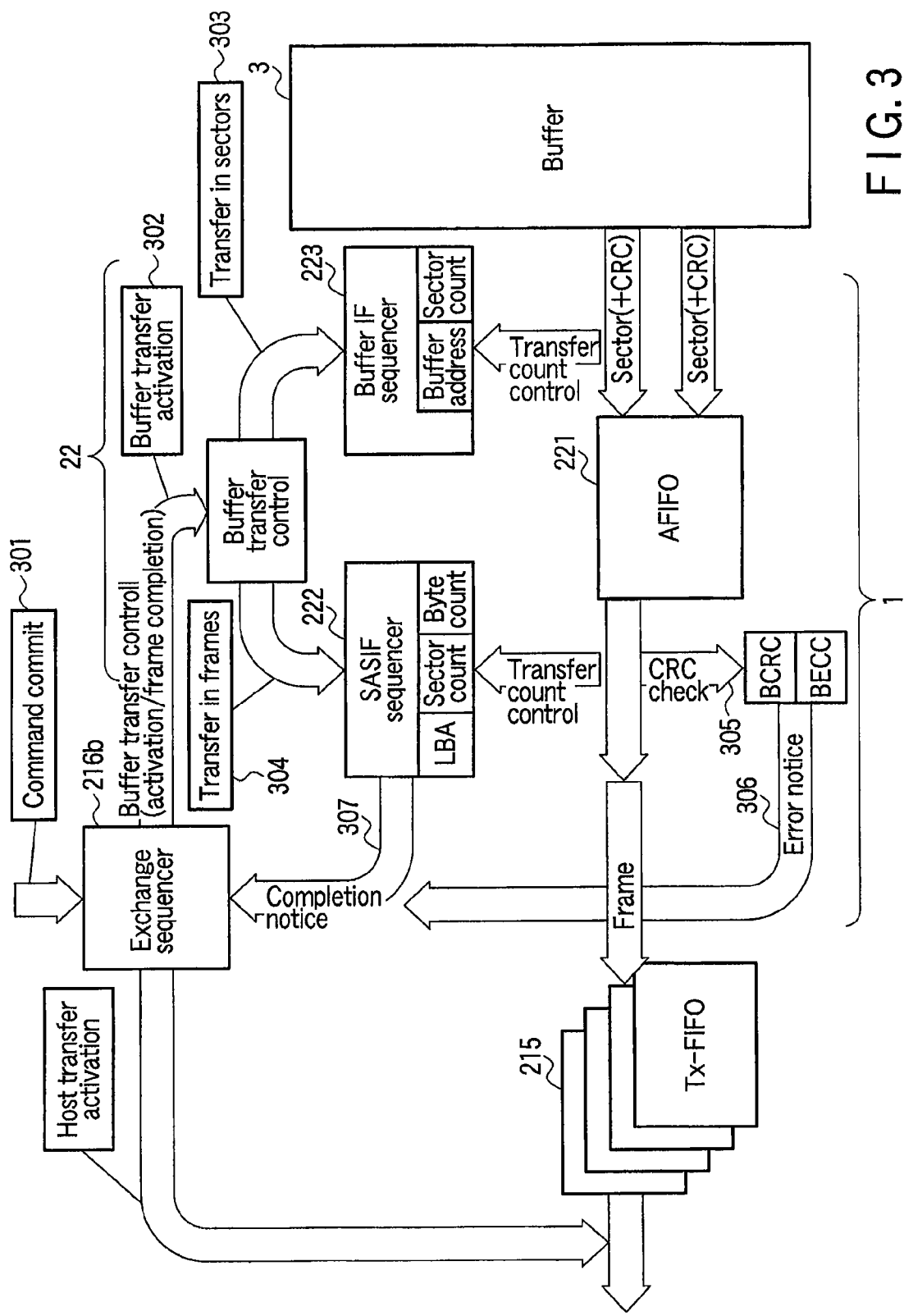
FIG. 3 is a diagram to explain exemplary read data transfer in the embodiment.

Next, data transfer in reading (read data transfer) in the embodiment will be explained with reference to an explanatory diagram in FIG. 3. Suppose a frame including a read command has just been transferred from the host to the host interface 2. The frame including a read command is received by the SAS module 21. The transport layer module 216 of the SAS module 21 extracts the read command included in the received frame (i.e., the read command from the host).

The CPU stores buffer transfer information into the exchange table 216a in association with the read command from the host according to a specific FW. The buffer transfer information includes the LBA (start logical block address) specified by the read command and the byte count. This is equivalent to a case that the CPU has stored a read command from the host into the exchange table 216a of the transport layer module 216 according to the FW. However, the buffer transfer information stored in the exchange table 216a includes a buffer address, a sector count, BCRC, and BECC not specified by the data transfer command (here, the read command) from the host. In the embodiment, default values are used as the initial values of the buffer address, BCRC, and BECC.

The CPU (FW) starts control to read data specified by the read command in sectors from the storage device and store the data in the buffer 3 temporarily. After having started the control, the CPU (FW) may store buffer transfer information corresponding to the read command into the exchange table 216a. In this case, the CPU (FW) uses the address of the buffer 3 in which a first sector data item is actually stored as the initial value of the buffer address (initial buffer address) in the buffer transfer information at the start of the control.

Thereafter, the CPU requests the exchange sequencer 216b of the buffer manager 1 to commit (or activate) the read command (block 301). By the request, the exchange sequencer 216b instructs the host-data path module 22 to activate buffer transfer in frames to control transfer of data (buffer transfer) specified by the read command (block 302).

At this time, the buffer transfer information stored in the exchange table 216a in association with the read command is set initially in the register files 224, 225, and 226 of the host-data path module 22. The buffer transfer information set in the register file 224 is used for the SASIF sequencer 222 and buffer IF sequencer 223 of the host-data path module 22 to perform data transfer control. The data transfer control performed by the SASIF sequencer 222 and buffer IF sequencer 223 is called internal control.

When the exchange sequencer 216b has instructed the host-data path module 22 to activate buffer transfer, the module 22 transfers data (read data) specified by the read command from the buffer 3 to TxFIFO 215 via AFIFO 221 on the basis of buffer transfer information set in the register file 224, that is, internal control buffer transfer information corresponding to the read command. Hereinafter, the transfer of read data from the buffer 3 to TxFIFO 215 will be explained in detail.

The buffer sequencer 223 of the host-data path module 22 transfers read data in sectors from the buffer 3 to AFIFO 221 on the basis of the buffer address and sector count in the internal control buffer transfer information corresponding to the read command (block 303). CRC data (more specifically, CRC data and ECC) is added to the data (sector data) taken out from the buffer 3 in sectors.

The buffer IF sequencer 223 updates the buffer address and sector count in accordance with the data transfer in sectors. In the embodiment, the sector count is decremented in accordance with data transfer in sectors. The buffer IF sequencer 223 performs data transfer in sectors until the sector count reaches "0." That is, the buffer IF sequencer 223 performs data transfer in sectors, taking no account of the byte count in the internal control buffer transfer information.

As a result, even when the transfer of as many bytes of data as indicated by the byte count (initial byte count) specified by the read command has been completed (or the transfer of one frame of data has been completed), if the boundary between sectors (the end of a sector) has not been reached, the buffer IF sequencer 223 takes out data items from the buffer 3 until the end of the sector is reached and transfers the data items to AFIFO 221. The buffer IF sequencer 223 performs such data transfer, thereby enabling the SASIF sequencer 222 to complete the CRC check (CRC operation). That is, the buffer IF sequencer 223 can transfer, in sectors, data (sector data) to which CRC data (more specifically, CRC data and ECC) necessary for a CRC check is added. As described below, this assures an error check on the entire frame generated by buffer transfer.

The SASIF sequencer 222 transfers read data specified by the read command from the host in frames from AFIFO 221 to TxFIFO 215 on the basis of the byte count in the internal control buffer transfer information (block 304). The SASIF sequencer 222 updates the sector count, byte count, and LBA in accordance with the data transfer in frames. In the embodiment, the byte count is decremented in accordance with the data transfer in frames.

In the data transfer in frames, the SASIF sequencer 222 carries out CRC operation to generate CRC data (CRC data and ECC) on the basis of the sector data constituting the transferred frame (that is, the sector data transferred in sectors from the buffer 3 to AFIFO 221). Then, the SASIF sequencer 222 checks the sector data for errors on the basis of the CRC operation result (generated CRC data) and the CRC data (CRC data and ECC) in the sector data (305). This error check is a CRC check.

In the embodiment, even when the byte count has reached zero, if the end of the sector has not been reached, the sector count at the time is stored as buffer transfer information. The SASIF sequencer 222 discards the data from the location where the byte count reached zero to the end of the relevant sector, that is, the extra data transferred to complete the CRC check (CRC operation). The CRC check need not be made at the time of data transfer in frames from AFIFO 221 to TxFIFO 215. For example, a CRC check may be made when data transferred in sectors from the buffer 3 is stored in AFIFO 221 temporarily.

If an error has been detected in the CRC check, the SASIF sequencer 222 informs the exchange sequencer 216b of the error (block 306). In contrast, if no error has been detected in the CRC check and the transfer of one frame from AFIFO 221 to TxFIFO 215 corresponding to the activation of buffer transfer in frames (block 302) has been completed, the SASIF sequencer 222 informs the exchange sequencer 216b of the completion of the buffer transfer (block 307).

When having recognized from notice of the completion of buffer transfer from the SASIF sequencer 222 that the transfer of one frame has been completed, the exchange sequencer 216b informs the host-data path module 22 of the frame completion. The update control module 227 in the host-data path module 22 feeds back the updated buffer transfer information at the time (current information) to the exchange table 216a in accordance with a sector transfer completion notice after the frame completion has been notified. That is, the update control module 227 updates the buffer transfer information held in the exchange table 216a to the current information for the next frame transfer (buffer transfer). The updated buffer transfer information is used to manage the next frame transfer (buffer transfer). The details of the feedback of the current information will be described later with reference to FIG. 13.

If the byte count has not reached zero after the buffer transfer information held in the exchange table 216a has been updated to the buffer transfer information (updated buffer transfer information) fed back by the SASIF sequencer 222, the exchange sequencer 216b instructs the host-data path module 22 to activate buffer transfer in frames (block 302). On the other hand, when data in the first frame in as many bytes of read data as specified by the read command has been transferred from AFIFO 221 to TxFIFO 215, the SAS module 21 starts command-based data transfer (frame transfer) from TxFIFO 215 to the host.

Figure 4:
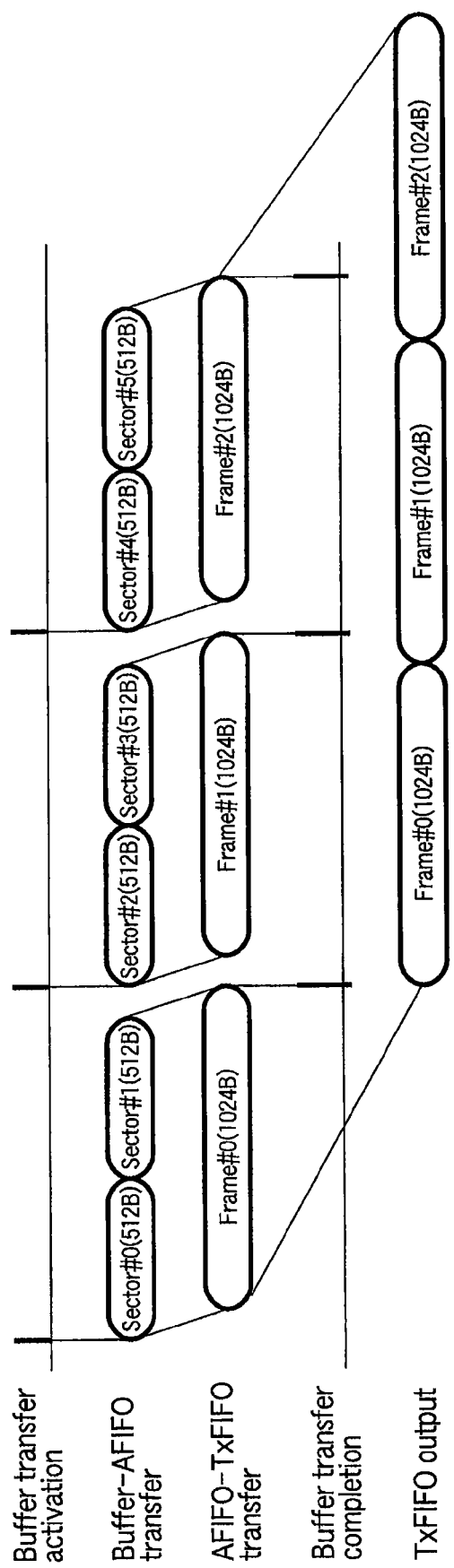
FIG. 4 is a timing chart to explain a first example of read data transfer in the embodiment.

FIG. 4 is a timing chart to explain example R1 of the aforementioned read data transfer. Example R1 shows a case where the end of a frame coincides with the end of a sector, with the length of one sector being 512 B (bytes) and the maximum length of one frame being 1024 B. Suppose buffer transfer is activated in frames and three frames #0 to #2 are transferred.

In example R1, buffer transfer for transferring read data specified by a read command from the buffer 3 to the host is activated in frames. Therefore, between frame transfers, buffer transfer for transferring data specified by another read command or write command (hereinafter, referred to as buffer transfer for another read/write) can be inserted. This prevents the buffer transfer efficiency from decreasing even if, for example, the execution of a read command involving read data transfer is being delayed. This effect becomes particularly greater when buffer transfer for transferring data specified by a write command is inserted preferentially between frame transfers, for example, between frame transfers for read data transfer. The reason for this is that the transfer of read data might be interrupted, depending on how much data the buffer 3 has stored, whereas it is ensured that write data can be transferred by request of the host. That is, the buffer transfer efficiency can be improved by using the area of the buffer 3, giving high priority to write data.

Figure 5:
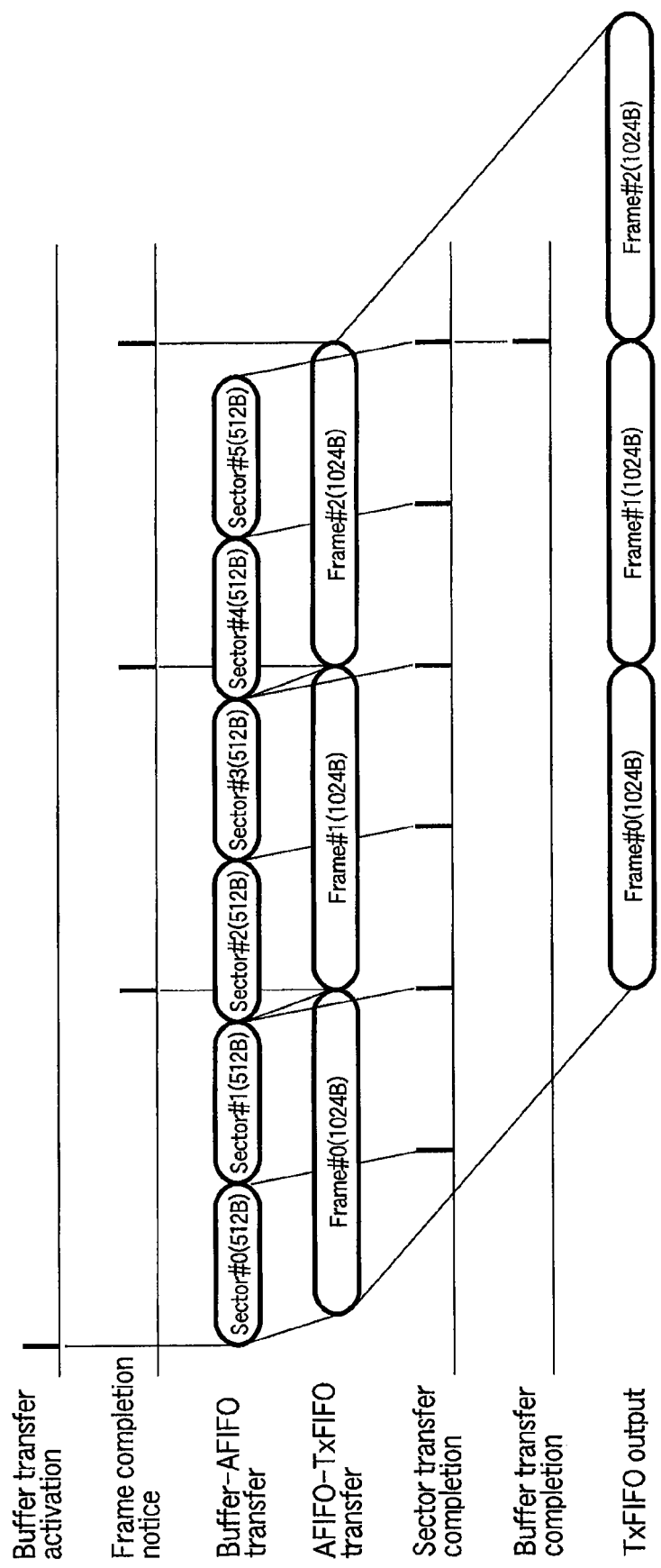
FIG. 5 is a timing chart to explain a second example of read data transfer in the embodiment.

FIG. 5 is a timing chart to explain example R2 of the aforementioned read data transfer. Like example R1, example R2 shows a case where the end of a frame coincides with the end of a sector, with the length of one sector being 512 B (bytes) and the maximum length of one frame being 1024 B. Suppose, in example R2, buffer transfer is activated in units of three frames. In this way, in example R2, buffer transfer for transferring read data specified by a read command from the buffer 3 to the host is activated in units of three frames. In this case, buffer transfer for another read/write can be performed after the completion of the transfer of three frames. In addition, since, in example R2, the number of activations is smaller than when buffer transfer is activated in frames, efficient buffer transfer can be realized.

Buffer transfer need not necessarily be activated in frames as in example R1 or in units of three frames as in example R2. For example, buffer transfer may be activated in units of two frames or in units of not less than four frames. That is, buffer transfer has only to be activated in units of at least one frame.

FIG. 6 is a timing chart to explain example R3 of the aforementioned read data transfer. Example R3 shows a case where the end of a frame does not coincide with the end of a sector, with the length of one sector being 528 B and the maximum length of one frame being 1024 B. As in example R1, buffer transfer is activated in frames. However, in example R3, when five sectors #0 to #4 are transferred, the corresponding data is divided into three frames #0 to #2, which are then transferred.

As seen from FIG. 6, in example R3, first frame #0 is composed of the data (258 B) in first sector #0 and 496 B from the beginning of the next sector #1. However, to transfer frame #0, the buffer IF sequencer 223 transfers the data in sector #0 and the data in sector #1 from the buffer 3 to AFIFO 221 in sectors sequentially. The SASIF sequencer 222 starts to transfer frame #0 to TxFIFO 215 in accordance with the transfer of sector #0 from the buffer 3 to AFIFO 221.

Frame #0 ends at the location 496 B from the beginning of sector #1. However, if the transfer of sector #1 has not been completed even when the transfer of frame #0 has been completed, the buffer IF sequencer 223 reads the remaining 32 B in sector #1 from the buffer 3 and transfers them to AFIFO 221. That is, even after having transferred the data (528 B) in sector #0 and 496 B (first data) from the beginning of the next sector #1 corresponding to frame #0 from the buffer 3 to AFIFO 221, the buffer IF sequencer 223 still reads the remaining 32 B (second data) in sector #1 from the buffer 3 and transfers them to AFIFO 221. The reason this is done is to cause the SASIF sequencer 222 to complete the CRC check (CRC operation) on the data in sector #1. In this way, reading the remaining data in a sector from the buffer 3 for a CRC check is called a dummy read.

The SASIF sequencer 222 reads the data in sector #0 from AFIFO 221 in accordance with the data transfer in sectors from the buffer IF sequencer 223, thereby starting to transfer frame #0 to TxFIFO 215. When having read the data in sector #0 from AFIFO 221, the SASIF sequencer 222 carries out a CRC operation for a CRC check on sector #0. Then, the SASIF sequencer 222 makes a CRC check on sector #0 on the basis of the result of the CRC operation and CRC data and ECC included in sector #0.

If no error has been detected in the CRC check on sector #0, the SASIF sequencer 222 reads 496 B from the beginning of sector #1 to continue the transfer of frame #0. At this time, the SASIF sequencer 222 starts a CRC operation for a CRC check on sector #1. When the SASIF sequencer 222 has read 496 B from the beginning of sector #1, the transfer of frame #0 to TxFIFO 215 is completed. In this way, when the transfer of frame #0 has been completed, the exchange sequencer 216b informs the host-data path module 22 of the frame completion and the current information is updated to the internal control buffer transfer information and the previous information is updated to the current information.

On the other hand, even after having transferred frame #0, the SASIF sequencer 222 reads the remaining 32 B in sector #1 from AFIFO 221 to complete the CRC operation. The intermediate results of the CRC operation from the beginning of sector #1 to 496 B, that is, a CRC value and ECC in the middle of the operation (hereinafter, referred to as CRC intermediate data and ECC intermediate data), are used as updated BCRC and BECC in the internal control buffer transfer information, respectively.

When the CRC operation has been completed up to the remaining 32 B in sector #1, that is, the CRC operation has ended, the SASIF sequencer 222 makes a CRC check. Specifically, the SASIF sequencer 222 performs a CRC check on sector #1 on the basis of the CRC data and ECC generated by the CRC operation and the CRC data and ECC included in sector #1.

If no error has been detected in the CRC check, the SASIF sequencer 222 issues a sector transfer completion notice. Then, the update control module 227 feeds back the updated buffer transfer information (current information) to the exchange table 216a to transfer the next frame #1. As a result, even in buffer transfer in which the end of frame #0 does not coincide with the end of sector #1, the CPU need not update the buffer transfer information held in the exchange table 216a according to FW to transfer the next frame #1.

The buffer transfer information fed back to the exchange table 216a is information at the time that a dummy read is not included. For example, the byte count in the buffer transfer information corresponds to the beginning location of the remaining 32 B in sector #1. BCRC and BECC in the buffer transfer information, that is, the updated BCRC and BECC, are the aforementioned CRC intermediate data and ECC intermediate data, respectively.

On the other hand, the SASIF sequencer 222 returns a buffer transfer completion notice to the exchange sequencer 216b. Then, the exchange sequencer 216b instructs the host-data path module 22 to activate buffer transfer for the transfer of the next frame #1 on the basis of the buffer transfer information fed back to the exchange table 216a from the update control module 227 (i.e., buffer transfer information indicating a state immediately before the remaining 32 B in sector #1 were read). Then, the buffer IF sequencer 223 of the host-data path module 22 transfers the remaining 32 B in sector #1 again from the buffer 3 to AFIFO 221 on the basis of the byte count in the buffer transfer information. The buffer IF sequencer 223 further transfers subsequent sector #2 and sector #3 from the buffer 3 to AFIFO 221.

The SASIF sequencer 222 transfers frame #1 composed of the remaining 32 B in sector #1, sector #2, and 464 B from the beginning of sector #3 from AFIFO 221 to TxFIFO 215. When frame #1 is transferred, the SASIF sequencer 222 resumes the CRC operation on the data in sector #1 on the basis of BCRC and BECC in the buffer transfer information (that is, the intermediate result of the CRC operation on 496 B from the beginning of sector #1) and the remaining 32 B in sector #1. As a result, even if data is transferred from the middle of sector #1 (or even if buffer transfer is activated from the middle of sector #1), the SASIF sequencer 222 can continue the CRC operation for a CRC check on sector #1 properly and complete the operation without reading entire sector #1 again or carrying out the CRC operation from the beginning.

The SASIF sequencer 222 further carries out a CRC operation on each of sector #2 and sector #3 and makes a CRC check on the basis of the CRC operation result. If no error has been detected in the CRC check and frame #1 has been transferred to TxFIFO 215, the SASIF sequencer 222 returns a buffer transfer completion notice to the exchange sequencer 216b. Frame #2 following frame #1 is also generated and transferred in the same manner as frame #1. Here, the end of frame #1 coincides with the end of sector #4. In the embodiment, the length of a frame need not be 1024 B and may be set to an arbitrary length in the range not exceeding 1024 B.

In example R3, too, buffer transfer for transferring read data specified by a read command from the buffer 3 to the host is activated in frames. Therefore, buffer transfer for another read/write can be inserted in between frame transfers. Even if buffer transfer for another read/write is inserted in between, for example, the transfer of frame #0 and the transfer of frame #1, frame #1 can be transferred efficiently on the basis of the byte count, BCRC, and BECC in the corresponding buffer transfer information.

Figure 7:
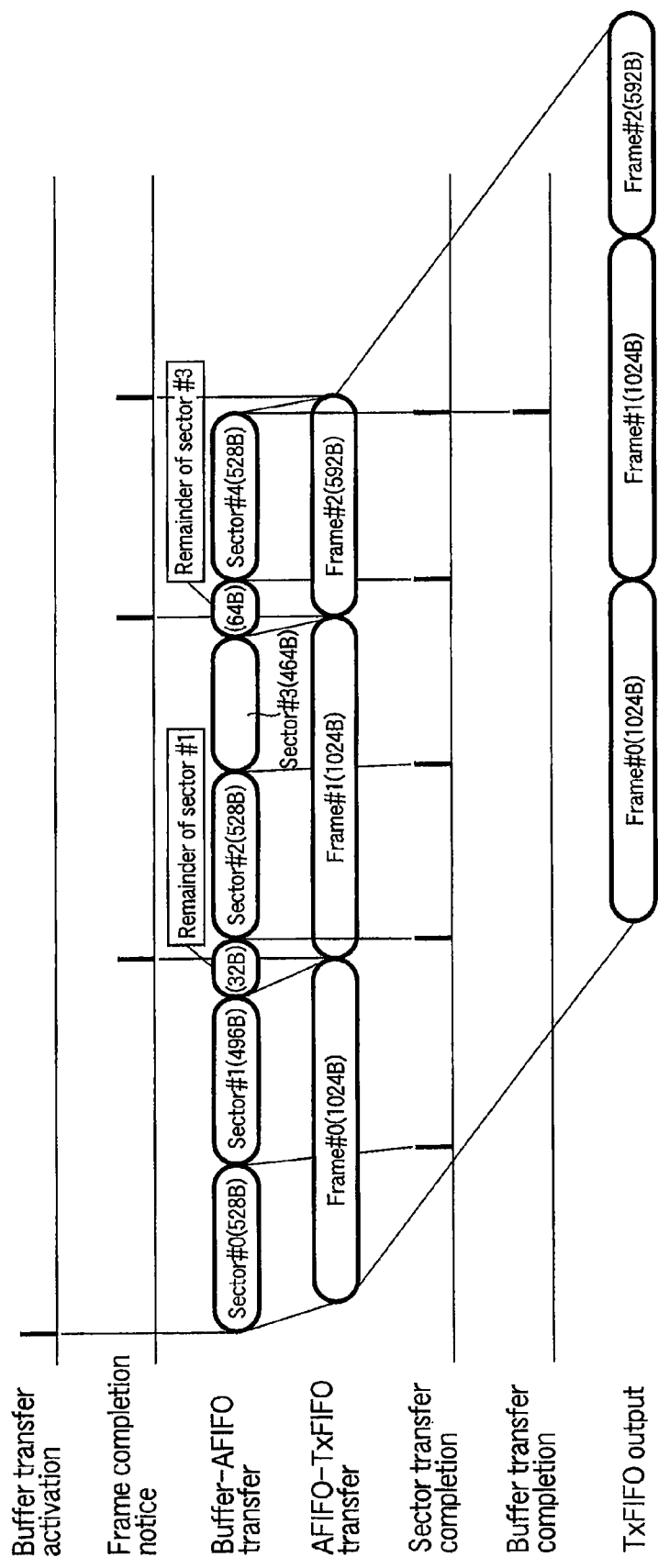
FIG. 7 is a timing chart to explain a fourth example of read data transfer in the embodiment.

FIG. 7 is a timing chart to explain example R4 of the aforementioned read data transfer. Like example R3, example R4 shows a case where the end of a frame does not coincide with the end of a sector, with the length of one sector being 528 B and the maximum length of one frame being 1024 B. In example R4, buffer transfer is activated in units of three frames as in example R2. As in example R3, when five sectors #0 to #4 are transferred, the corresponding data is divided into three frames #0 to #2, which are then transferred.

In example R4, first frame #0 is composed of the data (528 B) in first sector #0 and 496 B from the beginning of the next sector #1 as in example R3. That is, frame sector #0 has not been determined unless the buffer transfer of sector #1 has been completed. When the buffer transfer of sector #1 has been completed, the SASIF sequencer 222 informs the exchange sequencer 216b of the completion of the buffer transfer. As a result, the exchange sequencer 216b determines that frame #0 has been determined and informs the host-data path module 22 of the frame completion.

In addition, the SASIF sequencer 222 issues a sector transfer completion notice each time the buffer IF sequencer 223 has completed data transfer in sectors (sector transfer) from the buffer 3 to AFIFO 221. For example, when the remaining 32 B in sector #1 excluded from frame #0 have been transferred from the buffer 3 to AFIFO 221 to transfer frame #1, the SASIF sequencer 222 issues a sector transfer completion notice.

When the exchange sequencer 216b has informed the host-data path module 22 of the frame completion, the sequencer 216b waits for a sector transfer completion notice to be issued from the SASIF sequencer 222 and judges that the corresponding frame (in this case, frame #0) has been determined together with the CRC value. In addition, when the exchange sequencer 216b has received a buffer transfer completion notice from the SASIF sequencer 222 as a result of sector #4 having been transferred from the buffer 3 to AFIFO 221 to transfer frame #2, the sequencer 216b judges that all of the frames have been determined. In example R4, too, buffer transfer for another read/write can be performed after the completion of the transfer of three frames, frame #0 to frame #2.

Next, data transfer (write data transfer) in writing in the embodiment will be explained with reference to an explanatory diagram in FIG. 8. Suppose the host has just transferred a frame including a write command to the host interface 2. The frame including a write command is received by the SAS module 21. Write data specified by the write command is stored in RxFIFO 214.

The CPU (FW) stores buffer transfer information including the LBA and byte count specified by a write command (i.e., a write command from the host) included in the frame received by the SAS module 21 into the exchange table 216a in such a manner that the information is associated with the read command. Thereafter, the CPU requests the exchange sequencer 216b of the buffer manager 1 to commit the write command (block 801). In accordance with the request, the exchange sequencer 216b instructs the host-data path module 22 to activate buffer transfer in, for example, frames to control data transfer (buffer transfer) specified by the write command (block 802).

At this time, the buffer transfer information stored in the exchange table 216a in association with the write command is set initially in the register files 224, 225, and 226 of the host-data path module 22. The host-data path module 22 transfers data (write data) specified by the write command from RxFIFO 214 to the buffer 3 via AFIFO 221 on the basis of the buffer transfer information (internal control buffer transfer information) corresponding to the write command set in the register file 224. Hereinafter, the transfer of write data from RxFIFO 214 to the buffer 3 will be explained in detail. An explanation of what is equivalent to the transfer of read data described above will be omitted.

The SASIF sequencer 222 transfers write data specified by a write command from the host in frames from RxFIFO 214 to AFIFO 221 on the basis of the byte count in the buffer transfer information (block 803). At this time, the SASIF sequencer 222 carries out a CRC operation to generate CRC data and ECC in sectors on the basis of data transferred in frames from RxFIFO 214 to AFIFO 221 (block 804). According to the progress of the CRC operation, BCRC and BECC held in the register file 224 are updated. CRC data and ECC generated in sectors are added to data transferred in frames to AFIFO 221 (i.e., data temporarily stored in AFIFO 221 (block 805).

On the other hand, the buffer IF sequencer 223 transfers write data in sectors from AFIFO 221 to the buffer 3 on the basis of the buffer address and sector count in the buffer transfer information (block 806). When the transfer of as many bytes of data as indicated by the byte count (initial byte count) specified by the write command has been completed in transferring data in sectors, the buffer IF sequencer 223 completes the transfer in sectors at the time even if the end of a sector has not been reached.

Figure 9:
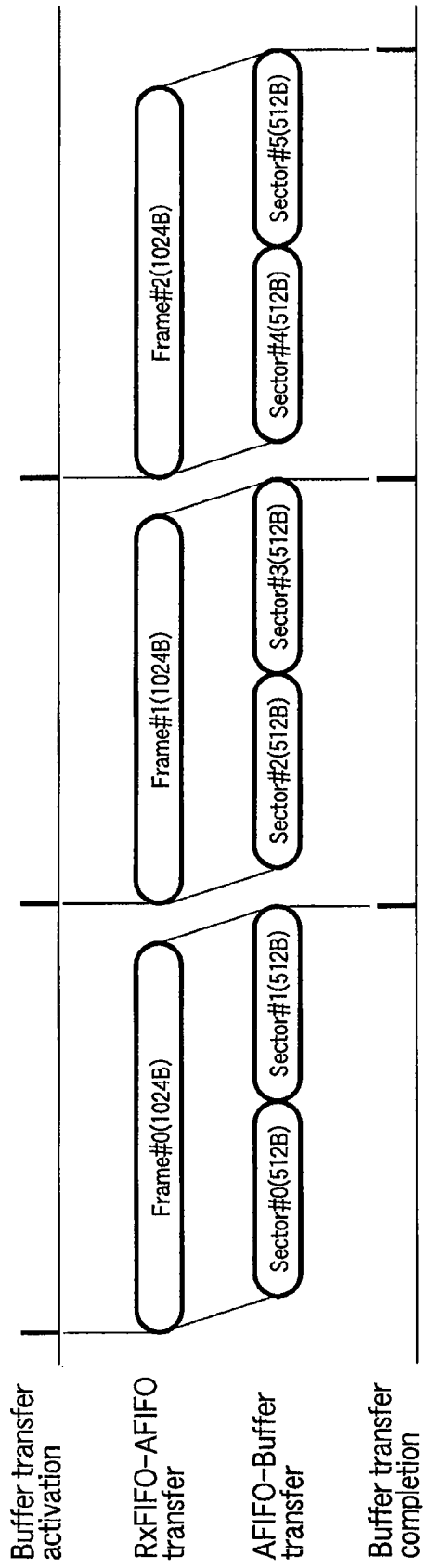
FIG. 9 is a timing chart to explain a first example of write data transfer in the embodiment.

FIG. 9 is a timing chart to explain example W1 of the aforementioned write data transfer. Example W1 shows a case where the end of a frame coincides with the end of a sector, with the length of one sector being 512 B (bytes) and the maximum length of one frame being 1024 B. Suppose buffer transfer is activated in frames and three frames are transferred. In example W1, buffer transfer for transferring write data from the host specified by a write command from the host to the buffer is activated in frames. Therefore, buffer transfer for another read/write can be inserted in between frame transfers.

Figure 10:
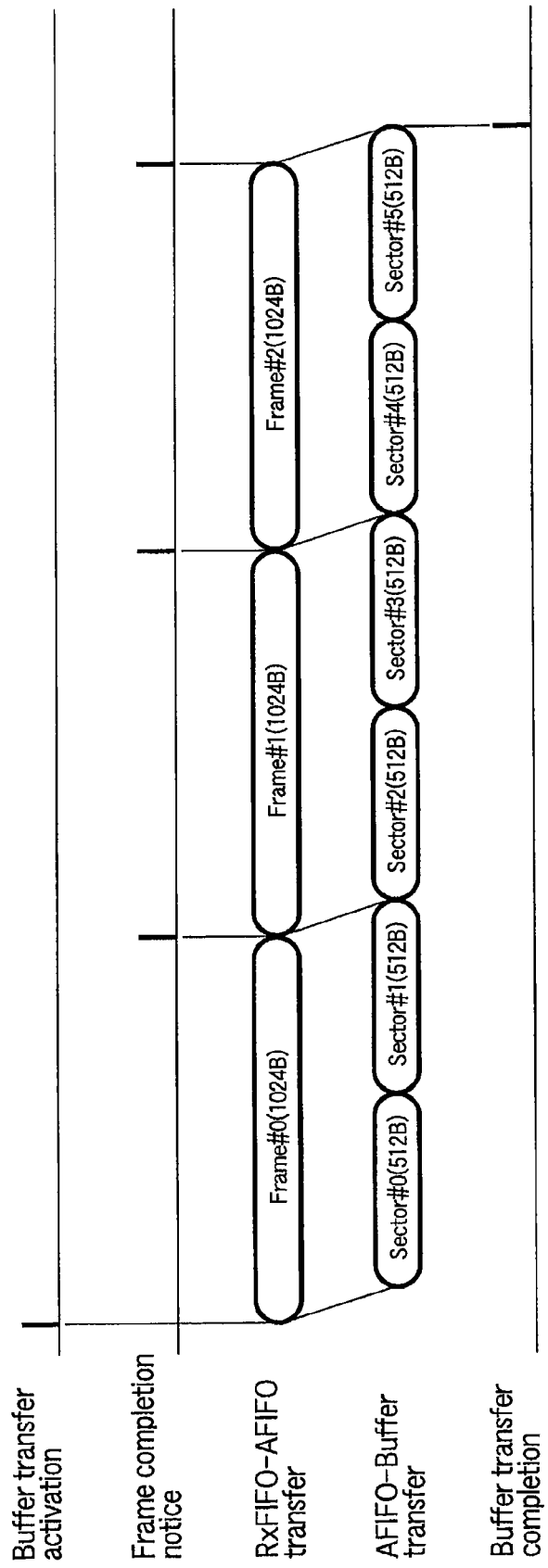
FIG. 10 is a timing chart to explain a second example of write data transfer in the embodiment.

FIG. 10 is a timing chart to explain example W2 of the aforementioned write data transfer. Like example W1, example W2 shows a case where the end of a frame coincides with the end of a sector, with the length of one sector being 512 B (bytes) and the maximum length of one frame being 1024 B. Suppose, in example W2, buffer transfer is activated in units of three frames as in example R2. In this way, in example W2, buffer transfer for transferring write data from the host specified by a write command to the buffer 3 is activated in units of three frames. In this case, buffer transfer for another read/write can be performed after the transfer of three frames has been completed.

Figure 11:
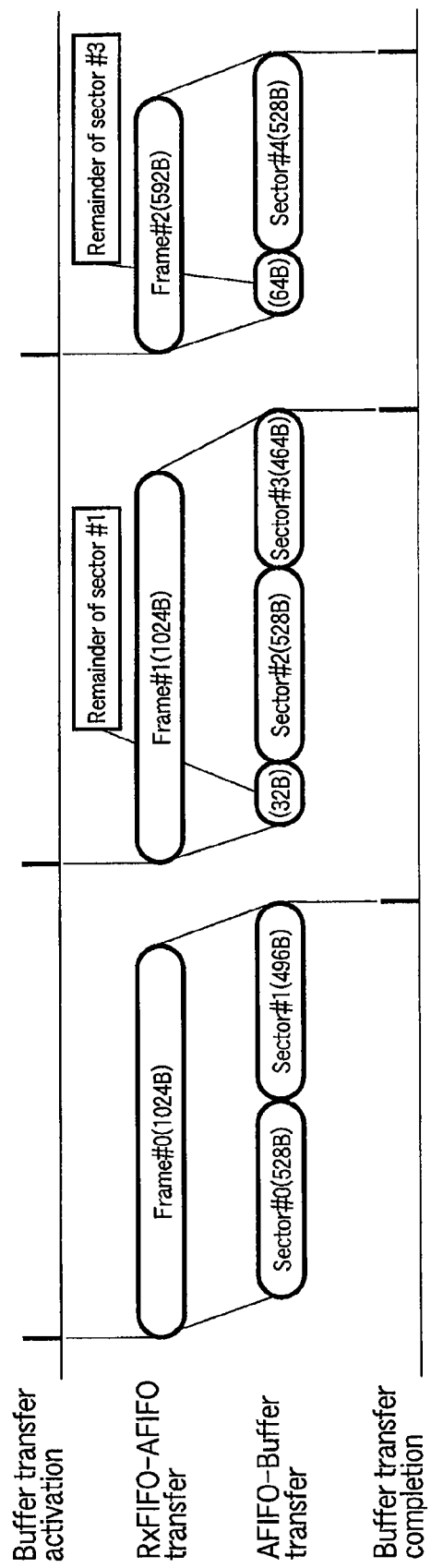
FIG. 11 is a timing chart to explain a third example of write data transfer in the embodiment.

FIG. 11 is a timing chart to explain example W3 of the aforementioned write data transfer. Example W3 shows a case where the end of a frame does not coincide with the end of a sector, with the length of one sector being 528 B and the maximum length of one frame being 1024 B. As in example W1, buffer transfer is activated in frames. However, in example W3, when three frames #0 to #2 are transferred, the corresponding data is divided into five sectors #0 to #4, which are then transferred.

In example W3, frame #0 is divided into sector #0 and sector #1. Sector #1 contains 496 B, 32 B less than 528 B. That is, frame #0 ends in the middle of sector #1. Therefore, the buffer IF sequencer 223 completes buffer transfer in sectors from AFIFO 221 to the buffer 3 at the time that 496 B from the beginning of sector #1 have been transferred. At this time, buffer transfer information fed back to the exchange table 216a by the update control module 227 is the current information updated to internal control information at the time that 496 B from the beginning of sector #1 have been transferred, that is, the current information updated to internal control information in a state where the remaining 32 B in sector #1 have not been transferred.

Then, the exchange sequencer 216b instructs the host-data path module 22 to activate buffer transfer for the next frame #1 on the basis of buffer transfer information fed back to the exchange table 216a by the update control module 227. As a result, the buffer IF sequencer 223 of the host-data path module 22 resumes buffer transfer in sectors from AFIFO 221 to the buffer 3, starting with the remaining 32 B in sector #1.

In example W3, the end of the last one of three frames #0 to #2 constituting write data specified by the write command coincides with the end of sector #4. As described above, in the embodiment, the length of a frame need not be 1024 B and may be set to an arbitrary length in the range not exceeding 1024 B. As in example W1, in example W3, buffer transfer for another read/write can be inserted in between frame transfers.

Figure 12:
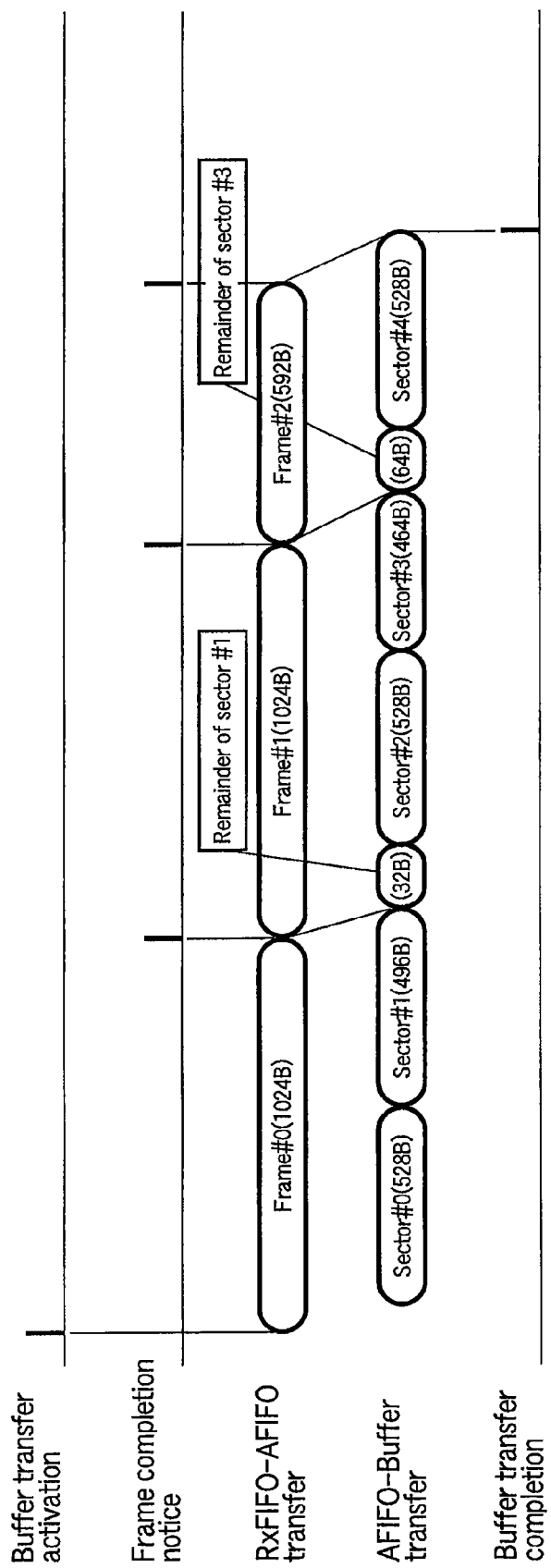
FIG. 12 is a timing chart to explain a fourth example of write data transfer in the embodiment.

FIG. 12 is a timing chart to explain example W4 of the aforementioned write data transfer. Like example W3, example W4 shows a case where the end of a frame does not coincide with the end of a sector, with the length of one sector being 528 B and the maximum length of one frame being 1024 B. As in example W2, buffer transfer is activated in units of three frames. Further, as in example W3, when three frames #0 to #2 are transferred, the corresponding data is divided into five sectors #0 to #4, which are then transferred.

In example W4, the SASIF sequencer 222 transfers all the frames #0 to ##2 from RxFIFO 214 to AFIFO 221 sequentially. The buffer IF sequencer 223 transfers all the frames #0 to #2 stored in AFIFO 221 in sectors sequentially.

After the buffer transfer has been completed, the update control module 227 feeds back buffer transfer information at the time (i.e., updated buffer transfer information) to the exchange table 216a. Even if frames #0 to #2 (i.e., a plurality of frames) are transferred sequentially, the end of each frame does not necessarily coincide with the end of the corresponding sector. In such a case, for example, the CRC data (BCRC/ BECC) and sector count in the updated buffer transfer information become useful. As in example W2, in example W4, buffer transfer for another read/write can be performed after three frames have been transferred.

FIG. 13 is a block diagram showing a configuration centered on a buffer transfer information management function of the buffer manager 1. As described above, the transport layer module 216 includes the exchange table 216a that holds buffer transfer information. The buffer transfer information held in the exchange table 216a is used to activate buffer transfer. The host-data path module 22 comprises the register files 224, 225, 226 and update control module 227 as described above. The register files 224, 225, 226 are initialized to the buffer transfer information held in the exchange table 216a when buffer transfer is activated.

The buffer transfer information held in the register file 224 is used to control the transfer sequence at the host-data path module 22 (i.e., to control the host-data path module 22). Therefore, the buffer transfer information held in the register file 224 is called internal control buffer transfer information.

The buffer transfer information held in the register file 225 is information on a frame now being transferred (current frame) and is updated dynamically as transfer progresses. The buffer transfer information held in the register 225 is used for the aforementioned feedback. The buffer transfer information held in the register file 225 may be called current information.

The buffer transfer information (current information) held in the register file 225 is updated to the buffer transfer information (internal control buffer transfer information) held in the register file 224 in accordance with the frame completion notice from the exchange sequencer 216b. The updated current information represents buffer transfer information for the next frame transfer (buffer transfer).

The buffer transfer information (previous information) held in the register file 226 is information on the previously transferred frame (previous frame). The buffer transfer information (previous information) held in the register file 226 is updated to the buffer transfer information (current information) held in the register file 225 in accordance with the frame completion notice from the exchange sequencer 216b. The buffer transfer information (previous information) held in the register file 226 is not used in a write operation.

The update control module 227 selects the buffer transfer information (current information or previous information) held in the register file 225 or 226 and updates the buffer transfer information held in the exchange table 216a to the selected buffer transfer information. That is, the update control module 227 feeds back the buffer transfer information held in the register file 225 or 226 to the exchange table 216a.

In the embodiment, the update control module 227 normally selects the buffer transfer information held in the register file 225, that is, the current information. The update control module 227 further selects the buffer transfer information held in the register file 226, that is, the previous information, in accordance with the frame completion notice from the exchange sequencer 216b. Then, the update control module 227 returns to the selection of the current information in accordance with a sector transfer completion notice after the frame completion notice.

In the embodiment, when an error has been detected in a CRC check made by the SASIF sequencer 222, no sector transfer completion notice is issued. In this case, the update control module 227 updates the buffer transfer information held in the exchange table 216a to the previous information. This makes it unnecessary for the CPU to update the buffer transfer information held in the exchange table 216a according to FW when a retry process is carried out because an error has been detected in a CRC check.

Figure 14:
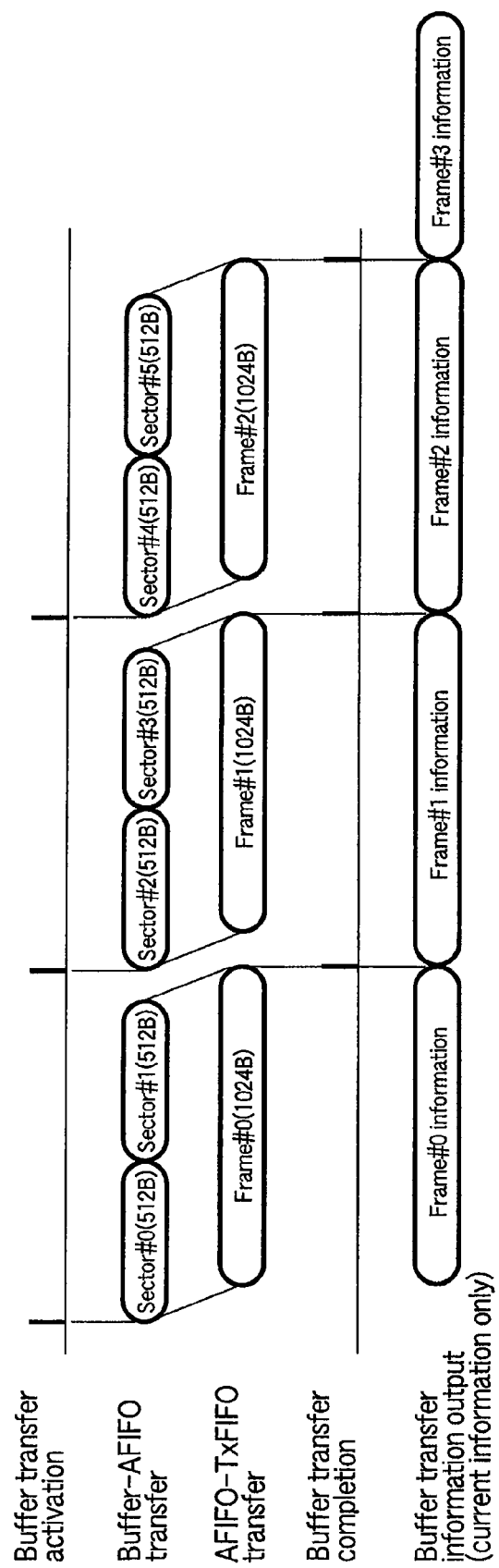
FIG. 14 is a timing chart to explain a first example of read data transfer in the embodiment in association with the transfer of buffer transfer information.

FIG. 14 is a timing chart to explain example R1 of the aforementioned read data transfer in association with the transfer of buffer transfer information. As described above, in example R1, the end of a frame coincides with the end of a sector and buffer transfer is activated in frames. In example R1, the buffer transfer information (current information) held in the register file 225 is always selected by the update control module 227.

Here, it should be noted that, when the transfer of, for example, frame #0 has been completed, the internal control buffer transfer information (frame #0 information) held in the register file 224 has been updated to buffer transfer information (frame #1 information) for transferring the next frame #1. In addition, it should be noted that the current information held in the register file 225 is updated to internal control buffer transfer information (frame #1 information) and the previous information held in the register file 226 is updated to the current information (frame #0 information) in accordance with a frame completion notice from the exchange sequencer 216*b* to the host-data path module 22. Moreover, it should be noted that the buffer transfer information held in the exchange table 216*a* is updated to the updated current information (frame #1 information).

Figure 15:
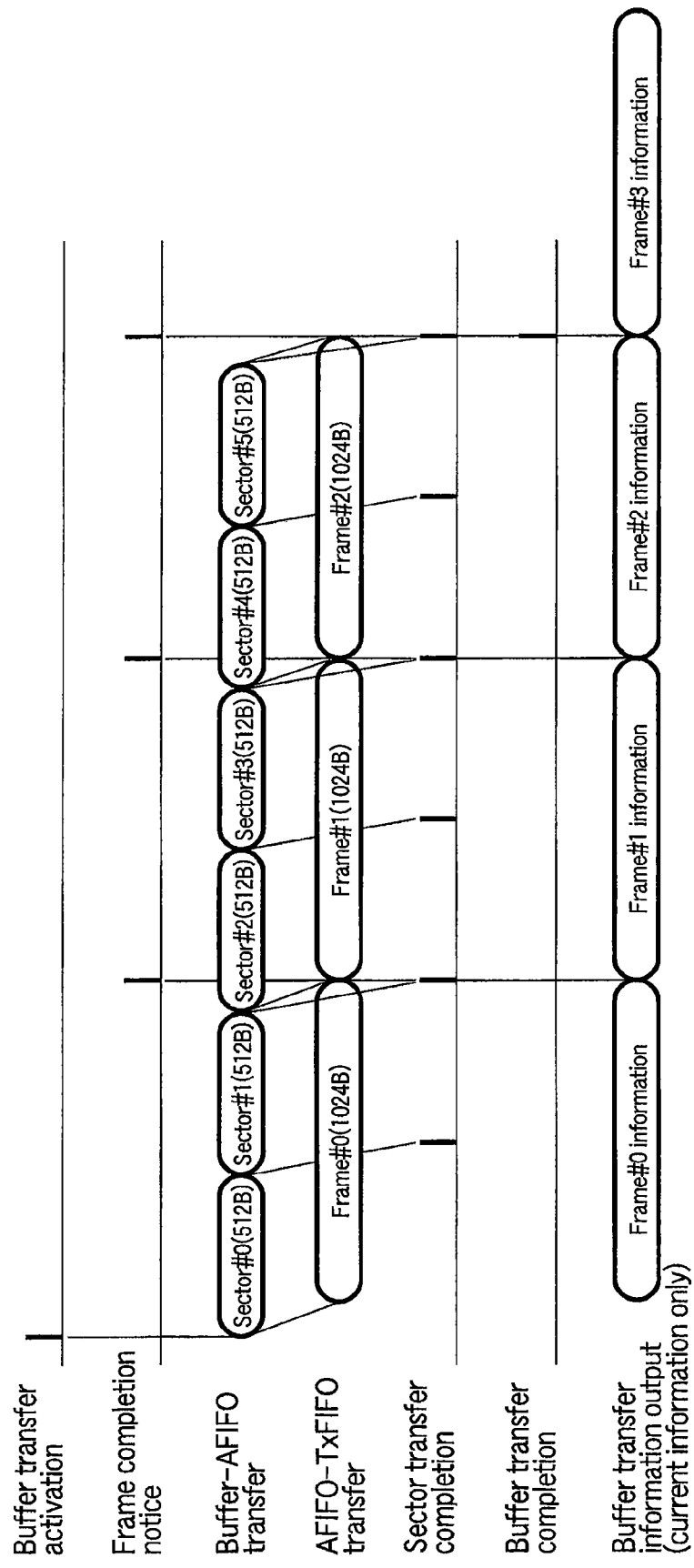
FIG. 15 is a timing chart to explain a second example of read data transfer in the embodiment in association with the transfer of buffer transfer information.

FIG. 15 is a timing chart to explain example R2 of the aforementioned read data transfer in association with the transfer of buffer transfer information. As described above, in example R2, the end of a frame coincides with the end of a sector and buffer transfer is activated in units of three frames. In example R2, the buffer transfer information (current information) held in the register file 225 is always selected by the update control module 227.

Figure 16:
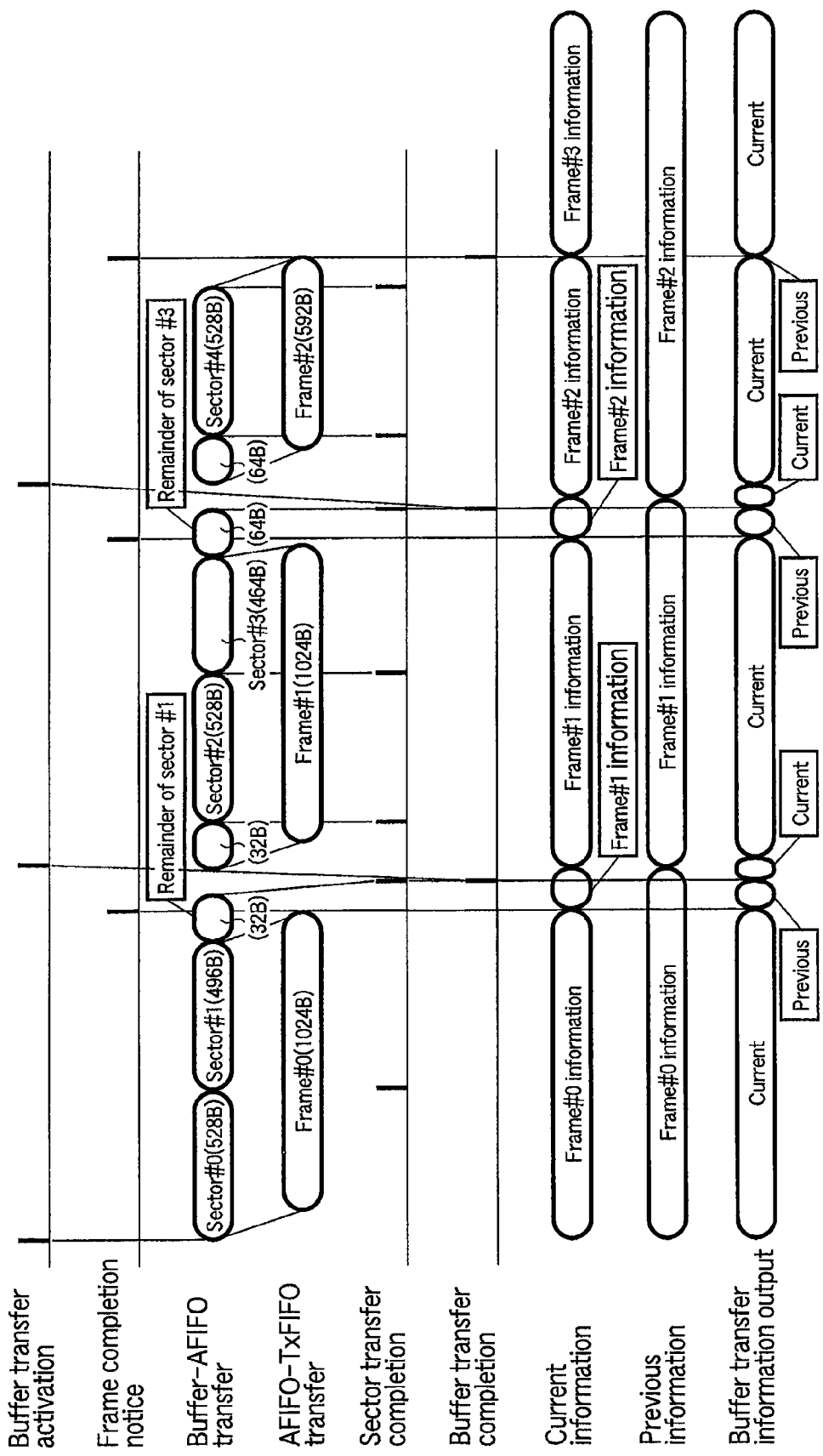
FIG. 16 is a timing chart to explain a third example of read data transfer in the embodiment in association with the transfer of buffer transfer information.

FIG. 16 is a timing chart to explain example R3 of the aforementioned read data transfer in association with the transfer of buffer transfer information. As described above, example R3 shows a case where the end of a frame does not coincide with the end of a sector, with the length of one sector being 528 B and the maximum length of one frame being 1024 B. In example R3, buffer transfer is activated in frames. When five sectors #0 to #4 are transferred, the corresponding data is divided into three frames #0 to #2, which are then transferred.

As seen from FIG. 16, in example R3, the buffer transfer information held in the register files 225 and 226 are updated to the buffer transfer information held in the register files 224 and 225 respectively in accordance with the frame completion notice from the exchange sequencer 216*b*. That is, the current information and previous information are updated to the internal control buffer transfer information and current information respectively at the time that the frame completion was notified.

The update control module 227 selects the previous information (the buffer transfer information held in the register file 226) in accordance with the frame completion notice. The update control module 227 returns to the selection of the current information in accordance with a sector transfer completion notice or a buffer transfer completion notice after the frame completion notice. As a result, the buffer transfer information held in the exchange table 216*a* is updated to the current information at the time that a sector transfer completion or a buffer transfer completion is notified.

In example R3, in the case of the last frame #2, a buffer transfer completion is notified immediately after a frame completion notice corresponding to the last frame #2. Therefore, the update control module 227 selects the previous information for a moment. In example R3, if an error has been detected in a CRC check in the buffer transfer of frame #i (i=0, 1, 2), a sector transfer completion notice is not issued. In this case, the update control module 227 does not return to the selection of the current information (or does not switch to the current information). That is, when a retry process is carried out because an error has been detected in the CRC check, the buffer transfer information held in the exchange table 216*a* is not updated to the current information. As a result, the transfer of frame #i in which an error has been detected can be retried (that is, a retry transfer of frame #i can be realized) without the need for the CPU (FW) to update the buffer transfer information.

Figure 17:
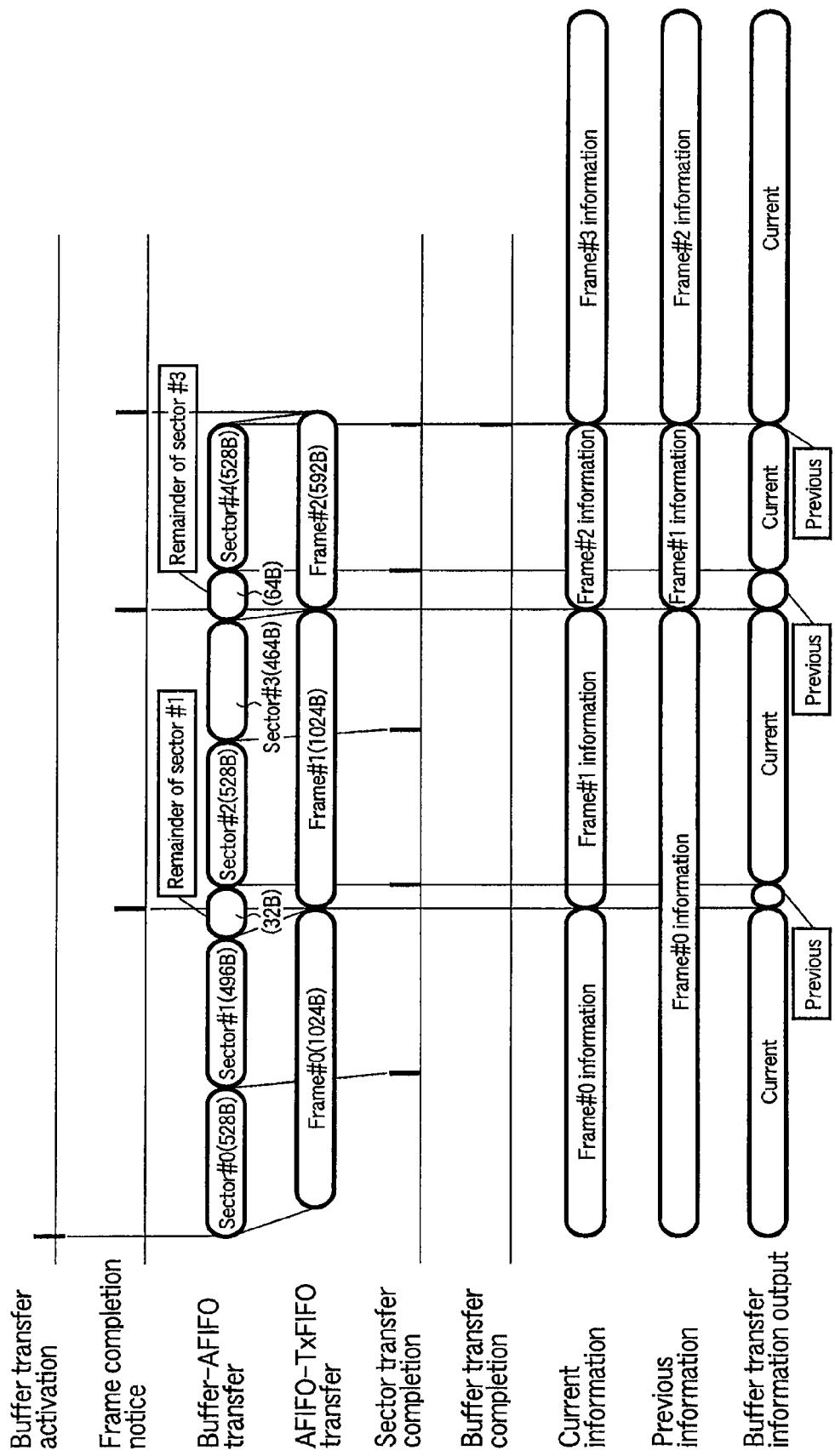
FIG. 17 is a timing chart to explain a fourth example of read data transfer in the embodiment in association with the transfer of buffer transfer information.

FIG. 17 is a timing chart to explain example R4 of the aforementioned read data transfer in association with the transfer of buffer transfer information. As described above, example R4 shows a case where the end of a frame does not coincide with the end of a sector, with the length of one sector being 528 B and the maximum length of one frame being 1024 B. In example R4, buffer transfer is activated in units of three frames. When five sectors #0 to #4 are transferred, the corresponding data is divided into three frames #0 to #2, which are then transferred. As seen from FIG. 17, in example R4, the buffer transfer information (the current information and previous information) held in the register files 225 and 226 are updated to the buffer transfer information held in the register files 224 and 225 respectively in accordance with the frame completion notice from the exchange sequencer 216*b*.

The update control module 227 selects the previous information (the buffer transfer information held in the register file 226) in accordance with the frame completion notice. The update control module 227 returns to the selection of the current information in accordance with a sector transfer completion notice or a buffer transfer completion notice after the frame completion notice. As a result, the buffer transfer information held in the exchange table 216*a* is updated to the current information at the time that a sector transfer completion or a buffer transfer completion is notified.

In example R4, in the case of the last frame #2, a buffer transfer completion is notified immediately after a frame completion notice corresponding to the last frame #2 has been notified. Therefore, the update control module 227 selects the previous information for a moment. In example R4, too, if an error has been detected in a CRC check in the buffer transfer of frame #i (i=0, 1, 2), a sector transfer completion notice is not issued as in example R3. In this case, the update control module 227 does not return to the selection of the current information. That is, when a retry process is carried out because an error has been detected in the CRC check, the buffer transfer information held in the exchange table 216*a* is not returned to the current information. As a result, a retry transfer of frame #i can be realized without the need for the CPU (FW) to update the buffer transfer information.

FIG. 18 is a timing chart to explain example W1 of the aforementioned write data transfer in association with the transfer of buffer transfer information. As described above, in example W1, the end of a frame coincides with the end of a sector and buffer transfer is activated in frames. In example W1, the buffer transfer information (the current information) held in the register file 225 is always selected by the update control module 227.

FIG. 19 is a timing chart to explain example W2 of the aforementioned write data transfer in association with the transfer of buffer transfer information. As described above, in example W2, the end of a frame coincides with the end of a sector and buffer transfer is activated in units of three frames. In example W2, too, the buffer transfer information (the current information) held in the register file 225 is always selected by the update control module 227.

Figure 20:
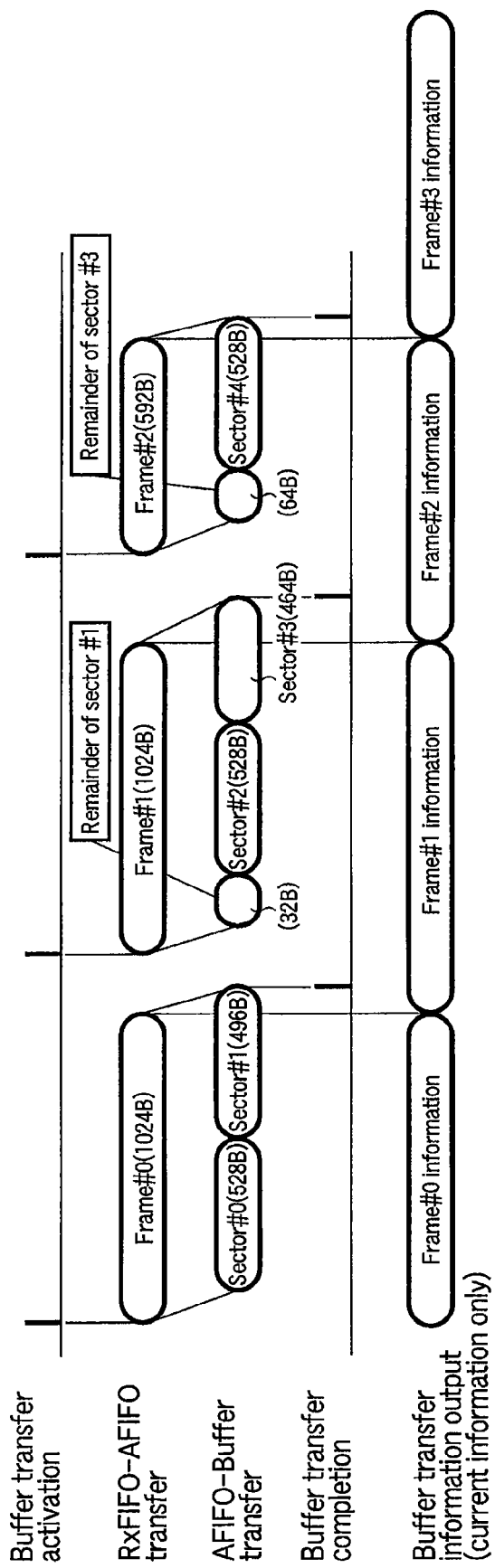
FIG. 20 is a timing chart to explain a third example of write data transfer in the embodiment in association with the transfer of buffer transfer information.

FIG. 20 is a timing chart to explain example W3 of the aforementioned write data transfer in association with the transfer of buffer transfer information. As described above, in example W3, the end of a frame does not coincide with the end of a sector and buffer transfer is activated in frames. In example W3, too, the buffer transfer information (the current information) held in the register file 225 is always selected by the update control module 227.

Figure 21:
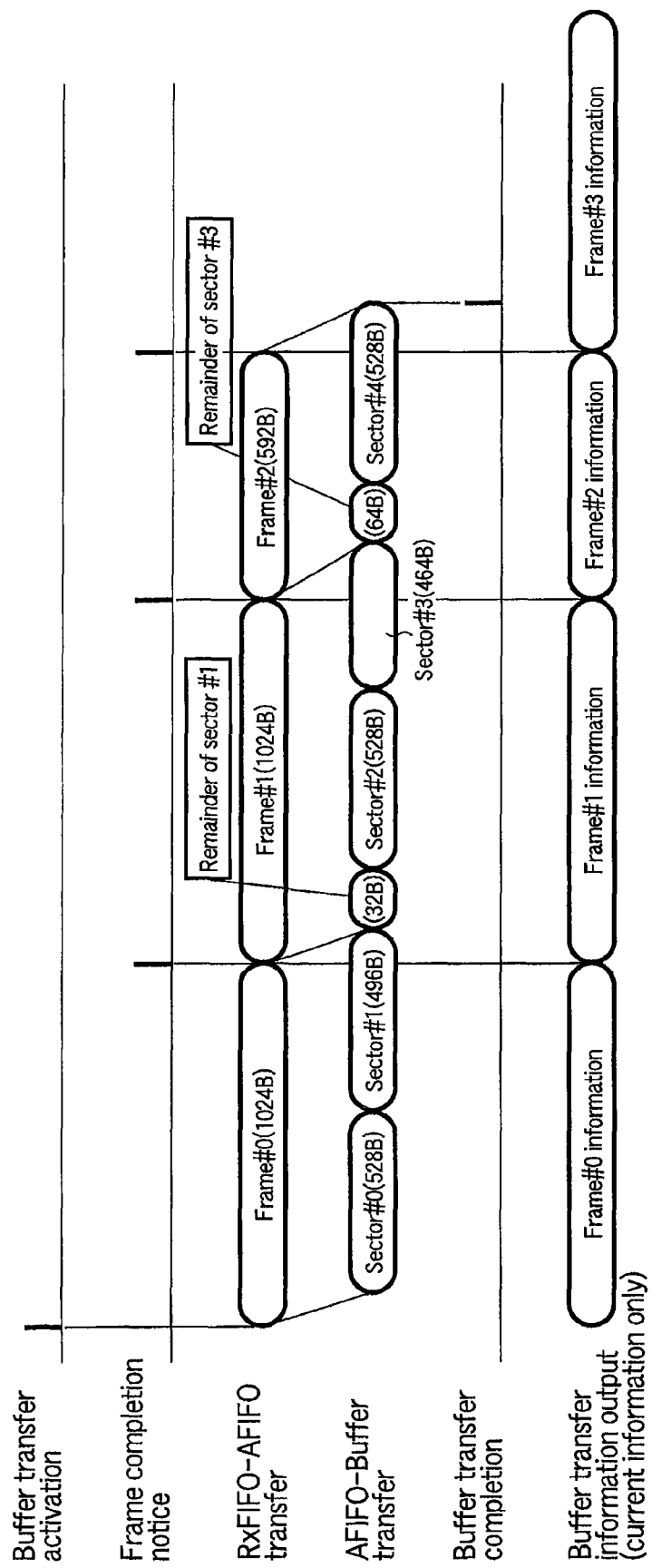
FIG. 21 is a timing chart to explain a fourth example of write data transfer in the embodiment in association with the transfer of buffer transfer information.

FIG. 21 is a timing chart to explain example W4 of the aforementioned write data transfer in association with the transfer of buffer transfer information. As described above, in example W4, the end of a frame does not coincide with the end of a sector and buffer transfer is activated in units of three frames. In example W4, too, the buffer transfer information (the current information) held in the register file 225 is always selected by the update control module 227. In this way, in write data transfer in the embodiment, the buffer transfer information (the current information) held in the register file 225 is always selected.

Figure 22:
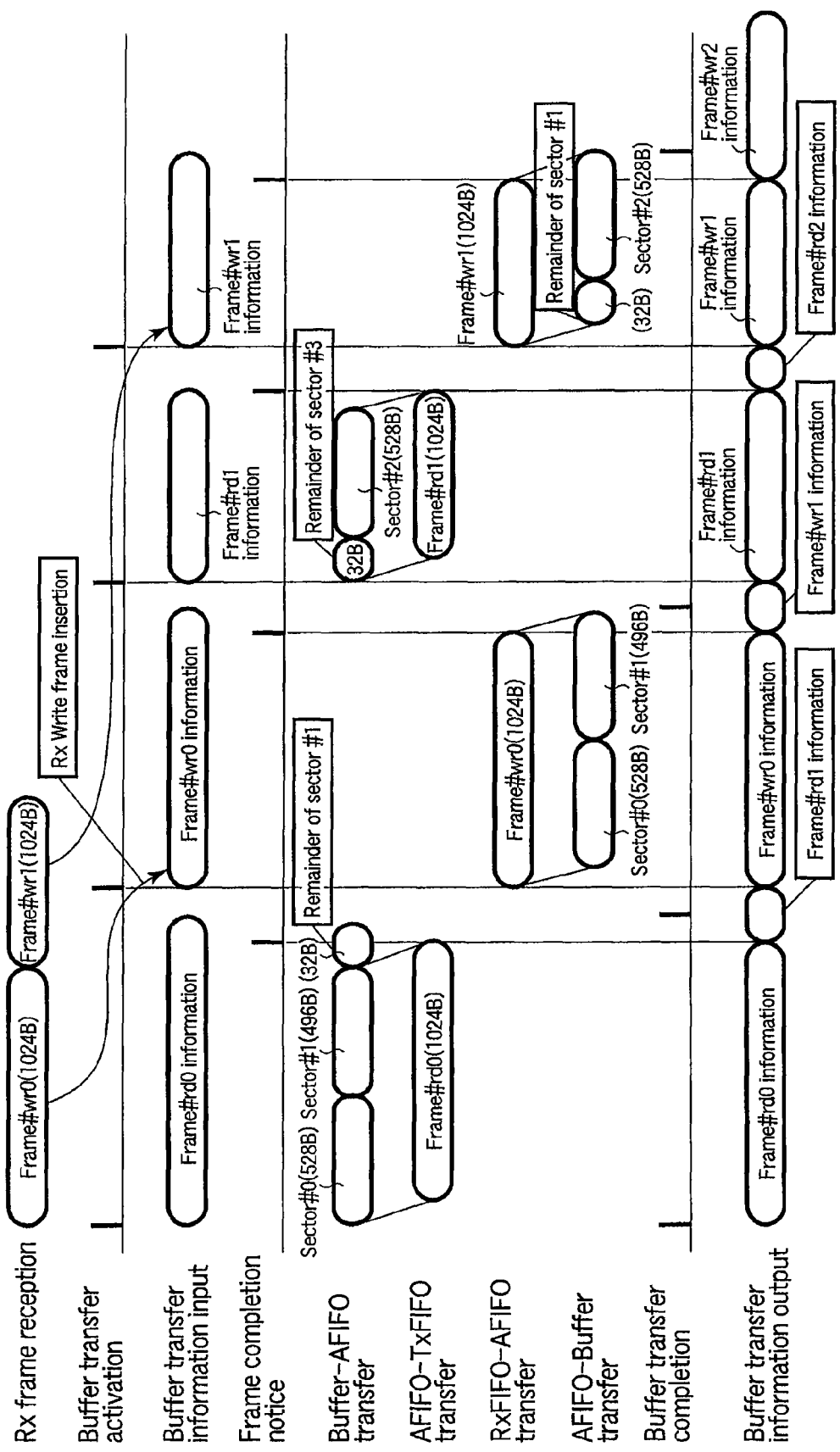
FIG. 22 is a timing chart to explain exemplary switching between read data transfer and write data transfer in the embodiment in association with the transfer of buffer transfer information.

Next, switching between read data transfer specified by read command #RC and write data transfer specified by write command #WC in the embodiment will be explained with reference to FIG. 22. FIG. 22 is a timing chart to explain the switching between read data transfer and write data transfer in association with the transfer of buffer transfer information. In the example of FIG. 22, buffer transfer is activated in frames and switching between read data transfer and write data transfer is performed at one-frame intervals.

As shown in FIG. 22, in read data transfer, frames #rd0 to #rd1 are transferred one after another from AFIFO 221 to TxFIFO 215. In write data transfer, frames #wr0 to #wr1 are transferred one after another from RxFIFO 214 to AFIFO 221. More specifically, in the example of FIG. 22, after frame #rd0 has been transferred in read data transfer, the read data transfer is switched to the transfer of frame #wr0 in write data transfer. After frame #wr0 has been transferred, the write data transfer is switched to the transfer of frame #rd1 in read data transfer. Then, after frame #rd1 has been transferred, the read data transfer is switched to the transfer of frame #wr1 in write data transfer.

For example, when the transfer of frame #rd0 has been completed, the current information and previous information held and managed in the host-data path module 22 (register files 225 and 226) are updated to the internal control buffer transfer information and current information at the time respectively in accordance with a frame completion notice from the exchange sequencer 216b. The updated current information and previous information are buffer transfer information (frame #rd1 information and frame #rd0 information) for transferring frame #rd1 and frame #rd0, respectively. In this case, the update control module 227 feeds back the updated current information (frame #rd1 information) to the exchange table 216a. As a result, the buffer transfer information corresponding to read command #RC held in the exchange table 216a is updated from frame #rd0 information to frame #rd1 information.

Thereafter, the CPU initially stores buffer transfer information (frame #wr0 information) corresponding to write command #WC into the exchange table 216a to switch from read data transfer of frame #rd0 to write data transfer of frame #wr0. As a result, when the next buffer transfer is activated, the internal control buffer transfer information, current information, and previous information held and managed in the host-data path module 22 (register files 224, 225, and 226) are updated to the buffer transfer information (frame #wr0 information) held in the exchange table 216a in association with write command #WC at the time. Then, on the basis of frame #wr0 information, frame #wr0 is transferred.

When the transfer of frame #wr0 has been completed, the current information and previous information held and managed in the host-data path module 22 (register files 224, 225, and 226) are updated to the internal control buffer transfer information and current information at the time respectively in accordance with a frame completion notice from the exchange sequencer 216b. The updated current information and previous information are buffer transfer information (frame #wr1 information and frame #wr0 information) for frame #wr1 and frame #wr0, respectively. In this case, the update control module 227 feeds back the updated current information (frame #wr1 information) to the exchange table 216a. As a result, the buffer transfer information corresponding to write command #WC held in the exchange table 216a is updated from frame #wr0 information to frame #wr1 information.

When the next buffer transfer is activated, the internal control buffer transfer information, current information, and previous information held and managed in the host-data path module 22 (register files 224, 224, and 226) are updated to the buffer transfer information (frame #rd1 information) held in the exchange table 216a in association with read command #RC at the time. Then, on the basis of frame #rd1 information, frame #rd1 is transferred. The subsequent operations are carried out in the same manner. In this way, buffer transfer for read data transfer specified by read command #RC and buffer transfer for write data transfer specified by write command #WC can be activated in such a manner that switching between the read data transfer and the buffer transfer is performed at one-frame intervals.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A buffer management device configured to manage data transfer specified by a data transfer command from a host, between a transmission FIFO and a buffer and between a reception FIFO and the buffer, the transmission FIFO being configured to store data to be transferred in frames to the host, and the reception FIFO being configured to store data transferred in frames from the host, the buffer management device comprising:
   an intermediate FIFO configured to store data transferred between the transmission FIFO and the buffer or between the reception FIFO and the buffer;
   a table configured to hold buffer transfer information for managing data transfer between the transmission FIFO and the buffer or between the reception FIFO and the buffer via the intermediate FIFO, the buffer transfer information comprising CRC data and a sector pointer;
   a first sequencer configured to activate buffer transfer for the data transfer specified by the data transfer command from the host in units of at least one frame based on buffer transfer information held in the table, the buffer transfer including transfer of data in sectors between the buffer and the intermediate FIFO;
   a second sequencer configured to transfer data in frames between the transmission FIFO and the intermediate FIFO or between the reception FIFO and the intermediate FIFO, in accordance with the activation of the buffer transfer, and to check the data transferred in sectors from the buffer to the intermediate FIFO for an error by generating CRC data for each sector data and comparing the generated CRC data with CRC data added to the corresponding sector data;

a third sequencer configured to transfer data in sectors between the intermediate FIFO and the buffer in accordance with the activation of the buffer transfer; and an update control module configured to update CRC data and a sector pointer held as buffer transfer information in the table when the buffer transfer of a first frame, prior to the buffer transfer of a second frame, has completed, the updated CRC data being generated based on first data from the beginning of a first sector at the end of the first frame to a location in the first sector corresponding to the end of the first frame, and the updated sector pointer indicating the first sector.

2. The buffer management device of claim 1, wherein:
the third sequencer is configured to transfer second data from a location in the first sector corresponding to the end of the first frame to the end of the first sector from the buffer to the intermediate FIFO if the end of the first frame does not coincide with the end of the first sector and the buffer transfer for the second frame is activated by the first sequencer; and
the second sequencer is configured to generate CRC data in the first sector based on the second data and the updated CRC data when the second data has been transferred to the intermediate FIFO.

3. The buffer management device of claim 2, wherein:
the third sequencer is configured to transfer data from the beginning to the end of the first sector from the buffer to the intermediate FIFO in the buffer transfer for the first frame; and
the second sequencer is configured to generate first CRC data based on data in the first sector transferred to the intermediate FIFO, to check the data in the first sector for an error based on the generated first CRC data, and to discard the second data in the first sector after having checked the data in the first sector for the error.

4. The buffer management device of claim 1, wherein, if an error in a sector data is detected, the update control module is configured to return the buffer transfer information held in the table to a state at the time the buffer transfer of a frame corresponding to the sector data was started.

5. The buffer management device of claim 1, wherein the first sequencer is configured to activate a second buffer transfer for data transfer specified by a second data transfer command differing from a first data transfer command in units of at least one frame based on buffer transfer information corresponding to the second data transfer command held in the table after having activated the first buffer transfer corresponding to the first data transfer command.

6. The buffer management device of claim 5, wherein the update control module is further configured:
to update, in order to transfer a next frame, buffer transfer information corresponding to the first data transfer command held in the table when the transfer of a frame started by the activation of the first buffer transfer has completed; and
to update, in order to transfer a next frame, buffer transfer information corresponding to the second data transfer command held in the table when the transfer of a frame started by the activation of the second buffer transfer has completed.

7. The buffer management device of claim 1, wherein the first sequencer is configured to activate the buffer transfer in units of a plurality of frames.

8. A storage apparatus comprising:
a transmission FIFO configured to store data to be transferred in frames to a host;

a reception FIFO configured to store data transferred in frames from the host;
a storage device;
a buffer configured to store data read from the storage device in sectors and data written into the storage device in sectors; and
a buffer management device configured to manage data transfer specified by a data transfer command from the host, between the transmission FIFO and the buffer and between the reception FIFO and the buffer,
wherein the buffer management device comprises:
an intermediate FIFO configured to store data transferred between the transmission FIFO and the buffer or between the reception FIFO and the buffer;
a table configured to hold buffer transfer information for managing data transfer between the transmission FIFO and the buffer or between the reception FIFO and the buffer via the intermediate FIFO, the buffer transfer information comprising CRC data and a sector pointer;
a first sequencer configured to activate buffer transfer for data transfer specified by the data transfer command from the host in units of at least one frame based on buffer transfer information held in the table, the buffer transfer including data transfer in sectors between the buffer and the intermediate FIFO;
a second sequencer configured to transfer data in frames between the transmission FIFO and the intermediate FIFO or between the reception FIFO and the intermediate FIFO, in accordance with the activation of the buffer transfer, and to check the data transferred in sectors for an error by generating CRC data for each sector data and comparing the generated CRC data with CRC data added to the corresponding sector data;
a third sequencer configured to transfer data in sectors between the intermediate FIFO and the buffer in accordance with the activation of the buffer transfer; and
an update control module configured to update CRC data and a sector pointer held as buffer transfer information in the table when the buffer transfer of a first frame, prior to the buffer transfer of a second frame, has completed, the updated CRC data being generated based on first data from the beginning of a first sector at the end of the first frame to a location in the first sector corresponding to the end of the first frame, and the updated sector pointer indicating the first sector.

9. A method of managing data transfer between a transmission FIFO and a buffer and between a reception FIFO and the buffer in a buffer management device which comprises a table and an intermediate FIFO, the transmission FIFO storing data to be transferred in frames to a host, the reception FIFO storing data transferred in frames from the host, and the buffer storing data transferred in sectors, the method comprising:
activating buffer transfer for data transfer specified by a data transfer command from the host in units of at least one frame based on the buffer transfer information held in the table, the buffer transfer including data transfer in sectors between the buffer and the intermediate FIFO, and the buffer transfer information comprising CRC data and a sector pointer;
transferring data in frames between the transmission FIFO and the intermediate FIFO or between the reception FIFO and the intermediate FIFO in accordance with the activation of the buffer transfer;
transferring data in sectors between the intermediate FIFO and the buffer in accordance with the activation of the buffer transfer;

checking the data transferred in sectors from the buffer to the intermediate FIFO for an error by generating CRC data for each sector data and comparing the generated CRC data with CRC data added to the corresponding sector data; and updating CRC data and a sector pointer held as buffer transfer information in the table when the buffer transfer of a first frame, prior to the buffer transfer of a second frame, has completed, the updated CRC data being generated based on first data from the beginning of a first sector at the end of the first frame to a location in the first sector corresponding to the end of the first frame, and the updated sector pointer indicating the first sector.

* * * * *